3,531,503
TETRACYCLIC COMPOUNDS AND PROCESSES
Marco Cereghetti and Andor Fürst, Basel, Switzerland,
and Gabriel Saucy, Essex Fells, and Milan Radoje
Uskokovic, Upper Montclair, N.J., assignors to Hoffmann-La Roche Inc., Nutley, N.J., a corporation of New Jersey
No Drawing. Continuation-in-part of application Ser. No. 400,221, Sept. 29, 1964. This application Feb. 15, 1967, Ser. No. 616,157
Claims priority, application Switzerland, Nov. 6, 1963, 13,632/63
Int. Cl. C07c 169/22, 169/23
U.S. Cl. 260—397.3                    19 Claims

ABSTRACT OF THE DISCLOSURE

10α- or 9β,10α-steroids are synthesized from normal steroids and by a variety of pathways are converted to desA-9-ene-5-one compounds. The latter are then react to form $\Delta^{9(11)}$-10α-5-hydroxy-3-one compounds which in turn are converted either by dehydration followed by hydrogenation or by hydrogenation followed by dehydration into 10α- or 9β,10α-steroids.

---

This application is a continuation-in-part of our copending application Ser. No. 400,221, filed Sept. 29, 1964.

This invention relates to novel tetracyclic chemical intermediates and processes useful in the preparation of steroids as well as to novel steroidal compounds. Natural steroids possess a 9α,10β-stereochemical configuration. Steroidal compounds possessing the unnatural 10α- or 9β,10α-configuration represent a pharmaceutically valuable class of compounds which, even though numerous members are known in the art, cannot be obtained except by cumbersome and lengthy preparative routes. In fact, the only previously known methods for obtaining steroids possessing the unnatural 9β,10α-configuration involve at least one photochemical reaction. Such photochemical reactions involve irradiation with ultraviolet light of strong intensity for long periods of time and, in comparison with purely chemical reactions, are very inefficient and give only small yields.

It is an object of the present invention to provide intermediates and processes which enable the preparation of 9β,10α-steroids without the necessity of proceeding through a photochemical reaction. It is also an object of this invention to provide intermediates and processes which enable the preparation of 10α-steroids according to methods which are more direct and facile than those previously known. It is also an object of this invention to provide novel intermediates and processes which will enable the further exploration of steroids having the unnatural 10α- or 9β,10α-configuration. It is also an object of this invention to provide novel 10α- and 9β,10α-steroids.

The novel intermediates and processes of this invention are valuable and provide a new synthetic route completely of a classical chemical nature for converting steroids having the normal configuration into steroidal compounds possessing the unnatural 10α- or 9β,10α-configuration.

In one aspect, the novel intermediates and processes of this invention enable the preparation of known 10α- and 9β,10α-steroids of the androstane series of the formula:

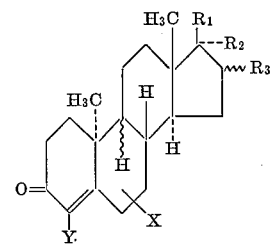

(I)

wherein

R₁ is individually, hydroxy or lower alkanoyloxy, or acetyl, hydroxyacetyl or haloacetyl;
R₂ is, individually, hydrogen or lower alkyl, or, when R₁ is acetyl or substituted acetyl, may also be hydroxy or halogen;
R₁ and R₂, when taken together, are (17β-OH, 17α-lower alkanoic acid lactone) or oxo;
R₃ is hydrogen, lower alkyl, hydroxy or lower alkanoyloxy, or, when R₁ is acetyl or substituted acetyl, may also be fluoro;
X is a substituent in the 6- or 7-position of the group hydrogen, lower alkyl, lower alkylthio, lower alkanoylthio or halogen; and
Y is hydrogen or lower alkyl.

These compounds may be further defined as androst-4-en-3-ones of the formula:

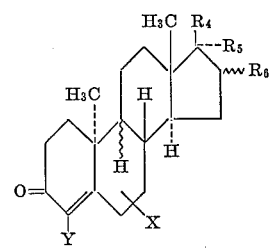

(Ia)

wherein

X and Y have the same meanings as above and
R₄ is, individually, hydroxy and lower alkanoyloxy;
R₅ is, individually, hydrogen and lower alkyl;
R₄ and R₅, when taken together, are (17β-OH, 17α-lower alkanoic acid lactone) and oxo; and
R₆ is hydrogen, lower alkyl, hydroxy or lower alkanoyloxy;

and pregn-4-en-3-ones of the formula:

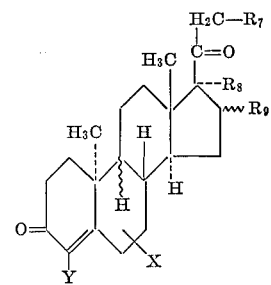

(Ib)

wherein

X and Y have the same meanings as above and
$R_7$ is hydrogen, halogen or hydroxy;
$R_8$ is hydrogen, lower alkyl, hydroxy or halogen; and
$R_9$ is hydrogen, lower alkyl, fluoro, hydroxy or lower alkanoyloxy.

The androst-4-en-3-ones of Formula Ia are anabolic agents. Those pregn-4-en-3-ones of Formula Ib wherein $R_7$ is hydrogen or halogen are useful as progestational agents, and those wherein $R_7$ is hydroxy are useful as salt-retaining agents, i.e., are useful in the treatment of Addison's disease.

The intermediates employed in accordance with this invention are generally represented by the following formulae:

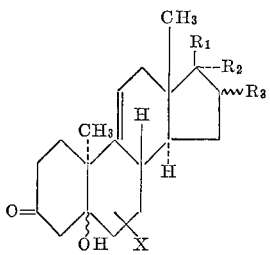

(II)

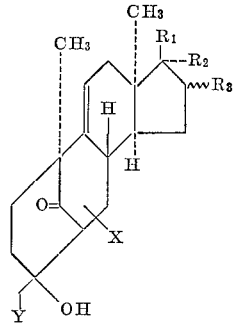

(III)

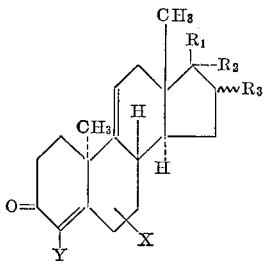

(IV)

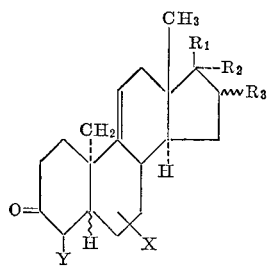

(V)

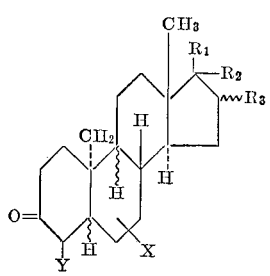

(VI)

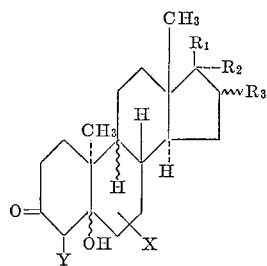

(VII)

wherein X, Y, $R_1$, $R_2$, and $R_3$ have the same meanings as above.

As used herein, the term "lower alkyl" comprehends both straight and branched chain saturated hydrocarbon groups, such as methyl, ethyl, propyl, isopropyl, and the like. Similarly, the term "lower alkanoyl" comprehends groups such as acetyl and the like, and the term "lower alkanoyloxy" comprehends groups such as acetoxy and the like. Halogen comprehends all four halogens, i.e., iodine, bromine, chlorine and fluorine.

The expression "(17β-OH, 17α-lower alkanoic acid lactone)" refers to a configuration on the C–17 carbon atom illustrated as follows:

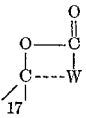

wherein W is lower alkylene, e.g., polymethylenes such as ethylene, propylene, or the like.

With respect to substituents in the 6- and 7-position, preferred compounds are those having hydrogen or lower alkyl in the 6- or 7-position, and those having halogen in the 7-position.

The products of Formula I are all readily derived from desA-androst-9-en-5-ones or desA-pregn-9-en-5-ones by a variety of processes, as illustrated by the following flowsheet:

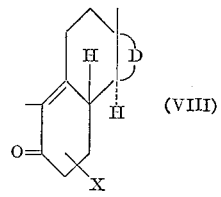

(VIII)

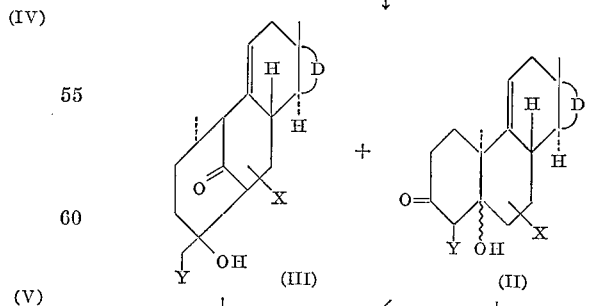

(III)   (II)

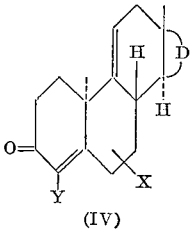 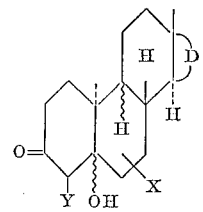

(IV)   (VII)

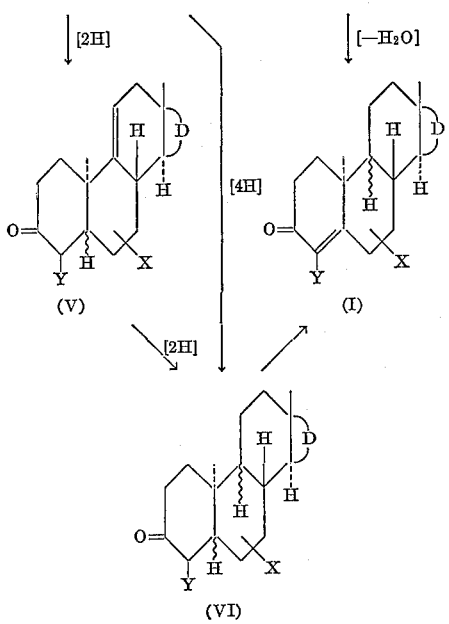

wherein X and Y have the same meanings as above and D represents the carbon and hydrogen atoms necessary to complete the steroid D-ring, as well as the atoms in the substituents in the 16- and 17-positions as defined in Formula I above.

Thus, the products of this invention are produced by one or more steps of the sequences of (A) condensing desA-androst-(pregn)-9-en-5-one (VIII) with a reaction partner, as hereinafter defined, to produce 3-hydroxy-4,5-seco - 3,6-cyclo-10α-androst(pregn)-9(11)-en-5-one (III) and 5-hydroxy-10α-androst(pregn)-9(11)-en-3-one (II) and (B) either (1) dehydrating (II) and/or (III) to form 10α-androsta(pregna)-4,9'(11)-dien-3-one (IV), partially or completely hydrogenating (IV) to form 10α-androst(pregn)-9(11)-en - 3 - one (V) or 10α-androst(pregn)an-3-one (VI), respectively, and dehydrogenating (VI) to form 10α-androst(pregn)-4-en-3-one (I); or (2) hydrogenating (II) to form 5-hydroxy-10α-androst (pregn)an-3-one (VII) followed by dehydrating (VII) to form (I).

As is readily apparent, these sequences involve four basic reaction techniques; viz (a) the reaction of desA-compound (VIII) with a reaction partner, as hereinafter defined, to produce a compound of Formulae II and III; (b) the saturation of double bonds present in the 4- and/or 9(11)-positions, i.e., the conversion of $\Delta^{4,9(11)}$-bis-dehydro compound (IV) to $\Delta^{9(11)}$-dehydro compound (V), the conversion of either $\Delta^{4,9(11)}$-bis-dehydro compound (IV) or $\Delta^{9(11)}$-dehydro compound (V) to saturated compound (VI), and the conversion of $\Delta^{9(11)}$-dehydro compound (II) to saturated compound (VII); (c) the dehydration of hydroxylated compounds to form $\Delta^4$-dehydrosteroids, i.e., the conversion of (II) and/or (III) to compound (IV) and the conversion of (III) to (I); and (d) the selective dehydrogenation of saturated steroid (VI) to $\Delta^4$-dehydrosteroid (I).

As will be appreciated from the above discussion, neither the specific reaction steps nor the reaction sequences of this invention involve any modification of substituents found in the 16- and/or 17-positions of the starting material natural steroids. However, in order to obtain unnatural 10α- or 9β,10α-steroids in accordance with this invention, it is necessary or desirable to protect certain of the 16- and/or 17-substituents against one or more of the reaction steps involved. It is also convenient to initially protect such a substituent in the starting material natural steroid and maintain the substituent in its protected form throughout the entire reaction sequence, regenerating the desired substituent only when the desired steroid possessing the unnatural 10α- or 9β,10α-configuration is obtained. On the other hand, it is sometimes convenient to insert a protecting group only before a certain reaction step or sequence of reaction steps. Said protecting group can then be maintained until the final reaction step or can be split off at some intermediate stage. The protecting groups can be inserted and split off by means known per se. The desirability of having protecting groups present will be further discussed below when the specific reaction steps are discussed in detail. The various substituents which are susceptible to being protected are exemplified by the 16-hydroxy group, the 17β-hydroxy group, and 17α-hydroxy or 20-oxo group, the 21-hydroxy group, or the 17-oxo group.

The 17-oxo or 20-oxo group is suitably protected by ketalization, i.e., by reaction with a lower alkanediol, to yield a 17-lower alkylenedioxy or 20-lower alkylenedioxy compound, i.e., a 17-ketal or a 20-ketal.

The 16-hydroxy, 17α-hydroxy, 17β-hydroxy or 21-hydroxy moieties can be protected by esterification and/or etherification of the hydroxy group. Any available acid which will form an ester that can subsequently be hydrolyzed to regenerate the hydroxy group is suitable. Exemplary acids useful for this purpose are lower alkanoic acids, e.g., acetic acid, caproic acid, benzoic acid, phosphoric acid and lower alkyl dicarboxylic acids, e.g., succinic acid. Also, protection for the 16α-hydroxy, 17α-hydroxy, or 21-hydroxy substituent can be effected by forming the lower alkyl ortho ester thereof, i.e., 16α,17α- or 17α,21-lower alkyl ortho esters. Exemplary ether protecting groups are the tert.-butoxy, the methoxy and the tetrahydropyranyloxy groups.

In compounds containing the dihydroxyacetone side chain at C-17 (for example, compounds wherein $R_1$ is hydroxyacetyl and $R_2$ is hydroxy), the side chain at C-17 can be protected by forming the 17,20; 20,21-bis-methylenedioxy group or by forming a 17-21-acetal or ketal group, or by forming a 17-21-diester. The 17-21-acetal or ketal and 17-21-diester hinder the 20-ketone group and minimize the possibility of its participating in unwanted side reactions. On the other hand, the 17,20; 20,21-bis-methylenedioxy derivatives actually convert the 20-oxo to a nonreactive derivative. When both a 16α-hydroxy and 17α-hydroxy substituent are present, these groups can be protected via formation of a 16α,17α-acetal or ketal. The various protecting groups mentioned above can be removed by means known per se, for example, by mild acid hydrolysis.

In compounds wherein there is present neither a 17α-hydroxy nor 21-hydroxy substituent but there is present a 20-oxo group, the 20-oxo group can be protected via reduction to the corresponding carbinol (hydroxy) group. Thus, for example, the 17-acetyl side chain can be protected via conversion to a 17-(α-hydroxyethyl) side chain. Regeneration of the 17-acetyl side chain can be simply effected via conventional oxidation means, for example, via oxidation with chromium trioxide in an organic solvent such as glacial acetic acid. Similarly in compounds containing a 17-oxo, this group can be protected by reduction to the corresponding carbinol (hydroxy) group. Thus, the 17-oxo group can be reduced to a 17β-OH, 17α-H-moiety, from which, when desired, the 17-oxo moiety can be regenerated by oxidation, as described above. Furthermore, a 20-hydroxy or 17β-hydroxy group, can itself be protected by esterification, for example, with a lower alkanoic acid such as acetic acid, caproic acid, or the like.

The 16α,17α- or 17α,21-acetals and ketals above discussed can be formed by reacting 16α,17α-bis-hydroxy or 17α,21-bis-hydroxy starting materials with an aldehyde or a ketone; preferably it is done by reacting a simple acetal or ketal (i.e., a lower alkylene glycol acetal or ketal or a suitable aldehyde or ketone) with the moieties sought to be protected.

Suitable aldehydes and ketones include lower alkanals of at least two carbon atoms, such as paraldehyde, propanal and hexanal; di(lower alkyl)ketones, such as acetone, diethylketone, dibutylketone, methylethylketone, and methylisobutylketone; cycloalkanones, such as cyclobutanone, cyclopentanone and cyclohexanone; cycloalkyl (lower alkanals), such as cyclopentylcarboxaldehyde and cyclohexylcarboxaldehyde; cycloalkyl lower alkyl ketones, ketones, such as cyclopentylpropyl ketone, cyclohexylmethyl ethyl ketone; dicycloalkyl ketones, such as dicyclopentyl ketone, dicyclohexyl ketone and cyclopentyl cyclohexyl ketone; cycloalkyl monocyclic aromatic ketones, such as cyclohexyl p-chlorophenyl ketone, cyclopentyl o-methoxyphenyl ketone, cyclopentyl o,p-dihydroxyphenyl ketone and cyclohexyl m-tolyl ketone; cycloalkyl-lower alkyl monocyclic aromatic ketones, such as cyclopentylmethyl phenyl ketone; cycloalkyl monocyclic aromatic-lower alkyl ketones, such as cyclopentyl benzyl ketone and cyclohexyl phenethyl ketone; cycloalkyl-lower alkyl monocyclic aromatic-lower alkyl ketones, such as cyclopentyl methyl benzyl ketone; halo-lower alkanals, such as chloral hydrate, trifluoro-acetaldehyde hemiacetal, and heptafluorobutanal ethyl hemiacetal; halo-lower alkanones, such as 1,1,1-trifluoroacetone; monocyclic carbocyclic aromatic aldehydes, such as benzaldehyde, halobenzaldehydes (e.g., p-chlorobenzaldehyde and p-fluorobenzaldehyde), lower alkoxy-benzaldehydes (e.g., o-anisaldehyde), di(lower alkoxy)-benzaldehydes (e.g., veratraldehyde), hydroxybenzaldehydes (e.g., salicyclaldehyde), lower alkyl benzaldehydes (e.g., m-tolualdehyde and p-ethylbenzaldehyde), di(lower alkyl)-benzaldehydes (e.g., o,p-dimethylbenzaldehyde); monocyclic carboxylic aromatic lower alkanals, such as phenylacetaldehyde, α-phenylpropionaldehyde, β - phenylpropionaldehyde, 4-phenylbutyraldehyde, and aromatically-substituted halo, lower alkoxy, hydroxy and lower alkyl cyano derivatives thereof; monocyclic carbocyclic aromatic ketones, such as acetophenone, α,α,α-trifluoroacetophenone, propiophenone, butyrophenone, valerophenone, halophenyl lower alkyl ketones (e.g., p-chloroacetophenone and p-chloropropionphenone); (lower alkoxy)-phenyl lower alkyl ketones (e.g., p-anisyl methyl ketone); di(lower alkoxy)-phenyl lower alkyl ketones; hydroxy-phenyl lower alkyl ketones; (lower alkyl)-phenyl lower alkyl ketones (e.g., methyl p-tolyl ketone); di(lower alkyl)-phenyl lower alkyl ketones (o,p-xylyl methyl ketone); benzophenone, and mono- or bis-substituted halo, lower alkoxy, hydroxy and lower alkyl derivatives thereof; monocyclic carbocyclic aromatic lower alkanones, such as 1-phenyl-3-butanone and 1-phenyl-4-pentanone, and aromatically-substituted derivatives thereof.

Especially suitable are those aldehydes or ketones which, with the 16α,17α- or 17α,21-bis-hydroxy grouping form an acetal or ketal group of the formula:

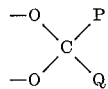

wherein P is individually selected from the group consisting of hydrogen and lower alkyl: Q is individually selected from the group consisting of lower alkyl and aryl; and P and Q taken together are lower alkylene.

The term "lower alkylene" comprehends polymethylene chains such as tetramethylene and pentamethylene.

In discussing the various starting materials, intermediates and end-products of this invention, the various protecting groups discussed above will not necessarily be specifically mentioned, but it should be understood that mention of any substituent comprehends the various protected forms thereof, unless specifically mentioned to the contrary.

The first step in the flowsheet set forth above is concerned with the production of the 5-hydroxy-10α-androst-9(11)-en-3-ones or 5-hydroxy-10α-pregn-9(11)-en-3-ones of Formula II and their isomeric 3-hydroxy-4,5-seco-3,6β-cyclo - 10α - androst-9(11)-en-5-ones and 3-hydroxy-4,5-seco - 3,6β-cyclo-10α-pregn-9(11)-en-5-ones of Formula III from desA-androst-9-en-5-ones or desA-pregn-9-en-5-ones of the formula:

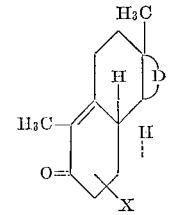

(VIII)

wherein X and D have the same meanings as above.

The conversion of a compound of Formula VIII to a compound of Formulae II or III is effected by condensing the compound of Formula VIII with a reaction partner selected from the group consisting of lower alkyl vinyl ketones (or substitutes therefor such as 1-dialkylamino-3-butanone, 1-dialkylamino-3-pentanone, and quaternary ammonium salts thereof), 1,3-dichlorobut-2-ene, 1,3-dichloropent-2-ene, 1-bromobutan-3-one, 1-bromobutan-3-one lower alkylene ketal, 1-bromobutan-3-ol, 1-bromobutan-3-ol ether, esterified 1-bromobutan-3-ol, 1-bromopentan-3-one, 1-bromopentan-3-one lower alkylene ketal, 1-bromopentan-3-ol, 1-bromopentan-3-ol ether or esterified 1-bromopentan-3-ol. Methyl vinyl ketone is the preferred reagent. Prior to the condensation it is desirable to protect the 20-keto group present in compounds of Formula VIII; then it is not necessary to protect 16α,17α- or 21-hydroxy groups or nonconjugated keto groups which are present, but groups protecting these moieties can be retained through condensation reaction.

When a lower alkyl vinyl ketone, 1-bromobutan-3-one or 1-bromopentan-3-one is used as the reaction partner for the condensation, the 10α-steroid of Formula II or its isomer III is formed directly. However, when 1,3-dichlorobut-2-one, 1,3-dichloropent-2-ene, 1-bromobutan-3-one lower alkylene ketal, 1-bromobutan-3-ol, 1-bromobutan-3-ol ether, esterified 1-bromobutan-3-ol, 1-bromopentan-3-one lower alkylene ketal, 1-bromopentan-3-ol, 1-bromopentan-3-ol ether, or esterified 1-bromopentan-3-ol is used as the reaction partner a subsequent step is required. When 1-bromobutan-3-ol or 1-bromopentan-3-ol is used as the reaction partner, the condensation product is subjected to an oxidation and for this purpose, it is suitable to use oxidation means known per se, for example, chromic acid, chromium trioxide in acetic acid, or the like. When esterified or etherified 1-bromobutan-3-ol or esterified or etherified 1-bromopentan-3-ol is used as the reaction partner, hydrolysis of the esterified or etherified hydroxy group should be effected prior to oxidation. Suitable ester-forming moieties are, for example, carboxylic acids, e.g., lower alkanoic acid such as acetic acid, benzoic acid, and the like; and hydrolysis of the reaction products obtained by reacting such 1-bromopentan-3-ol esters is suitably conducted by alkaline hydrolysis, e.g., via the use of an aqueous alkali metal hydroxide, such as aqueous sodium hydroxide. Suitable ethers are, for example, lower alkyl ethers, i.e., 3-methoxy, 3-ethoxy, or the like; and these are suitably hydrolyzed by acid hydrolysis, e.g., via the use of an aqueous mineral acid such as hydrochloric acid, sulfuric acid, or the like. When a 1-bromobutan-3-one lower alkylene ketal or a 1-bromopentan-3-one lower alkylene ketal is used as the reaction partner, mild acid hydrolysis of the ketal moiety results in the formation of compound II or III. Finally, when 1,3-dichlorobut-3-ene or 1,3 - dichloropent-3-ene is used as the reaction partner, compounds of Formulae II and III can be generated by treatment with a concentrated mineral acid, preferably a strong acid such as hydrochloric acid or sulfuric acid. As will be apparent, when a reaction partner based on butane (i.e., having a four carbon atoms skeleton) is utilized, a compound wherein Y is hydrogen is obtained. Similarly, when a reaction partner based on pentane is utilized, a compound wherein Y is methyl is obtained.

The condensation is suitably effected at below or above room temperature, for example, at the reflux temperature of the reaction medium or at ice temperature (0° C.) or below. Moreover, the condensation is suitably effected in an organic medium. Preferably the solvent is a lower alkanol, such as methanol or ethanol, or another non-ketonic organic solvent, such as an ether, e.g., dioxane, aromatic hydrocarbon, e.g., benzene, toluene, xylene, organic acid, such as acetic acid, or the like. It is suitable to catalyze the condensation, and this can be effected via use of a catalyst such as an alkali metal lower alkoxide, for example, sodium ethoxide, or the like, alkali metal hydroxide, a quaternary ammonium hydroxide such as benzyl trimethyl ammonium hydroxide, para-toluenesulfonic acid, or the like.

When using a substitute for the lower alkyl vinyl ketone, the condensation should be effected under alkaline conditions. As indicated above, among such substitutes are 1-dialkylamino-3-butanone and 1-dialkylamino-3-pentanone. Preferred dialkylamino groups are dilower alkylamino groups such as dimethylamino, diethylamino, piperidino, morpholino, or the like. Preferred quaternary ammonium salts of such tertiary amino groups are, for example, those formed from lower alkyl halides such as methyl iodide.

As indicated above, the product of the reaction of des A-compound VIII with this reaction partner (i.e., methyl vinyl ketone and the like) is a mixture of compounds II and III, which may be separated by known techniques, such as chromatography, if desired. Both products, with or without separation, may be subjected to the dehydration process hereinafter described, to yield $\Delta^{4,9(11)}$-bis-dihydro-steroid IV. However, only 5-hydroxy-$\Delta^{9(11)}$-dihydro-steroid II can be hydrogenated to form 5-hydroxy-steroid VII. Although purification of these reaction products is not essential prior to their use in subsequent steps, it is desirable to provide a good yield of the resulting product and to simplify recovery procedures in subsequent steps.

Although the 5-hydroxy-isomers of steroid VII are produced, the 5$\beta$-isomer is much less stable than the 5$\alpha$-isomer. Accordingly, only the latter of the two is isolated from the reaction mixture in significant amount.

The second major process technique employed in producing the products of this invention comprises the hydrogenation of the $\Delta^4$-and/or $\Delta^{9(11)}$-double bonds of the 5-hydroxy - 10$\alpha$-androst-9(11)-en-3-ones and 5-hydroxy-10$\alpha$-pregn-9(11)-en-3-ones of the formula:

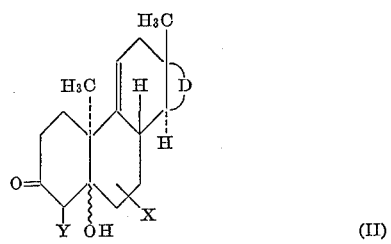

(II)

wherein X, Y and D have the same meanings as above, the 10$\alpha$-androsta-4,9(11)-dien-3-ones and 10$\alpha$-pregna-4,9(11)-dien-3-ones of the formula:

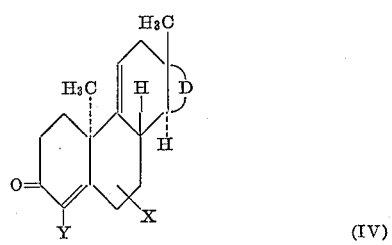

(IV)

wherein X, Y and D have the same meanings as above, as well as the 10$\alpha$-androst-9(11)-en-3-ones and 10$\alpha$-pregn-9(11)-en-3-ones of the formula:

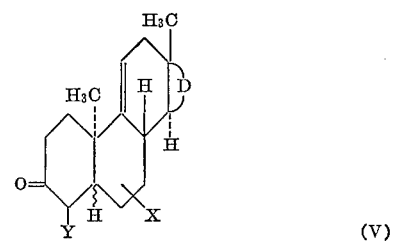

(V)

wherein X, Y and D have the same meanings as above.

In one embodiment, compounds of Formulae II, IV and V are catalytically hydrogenated. Such catalytic hydrogenation of compounds of Formulae IV and V yields compounds of Formula VI:

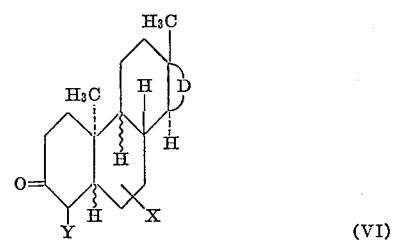

(VI)

wherein X, Y and D have the same meanings as above.

Catalytic hydrogenation of a compound of Formula II gives a compound of the formula:

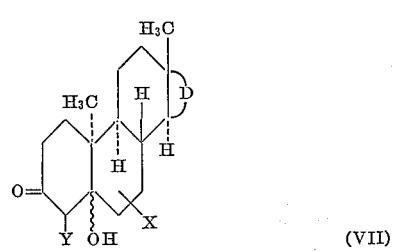

(VII)

wherein X, Y and D have the same meanings as above.

Catalytic hydrogenation according to this invention gives 10$\alpha$- and/or 9$\beta$,10$\alpha$-steroids. As will be apparent, the above-discussed catalytic hydrogenation involves the saturation of the 9(11)-double bond and the hydrogen atom inserted into the 9-position can assume either the 9$\alpha$- or the 9$\beta$-stereoconfiguration. Hydrogenation of a compound of Formula II or V wherein the hydrogen or hydroxy group in the 5-position is $\alpha$ favors the formation of a 9$\alpha$-hydrogen whereas catalytic hydrogenation of a compound of Formulae II or V wherein the 5-substituent is $\beta$ favors the insertion of a 9$\beta$-hydrogen.

The above-discussed catalytic hydrogenation of the 9(11)-double bond can suitably be effected by hydrogenating in the presence of a suitable metal catalyst; for example, a noble metal catalyst such as platinum, palladium, ruthenium, rhodium, or the like. The hydrogenation can be effected in neutral, acid or alkali medium. Thus, for example, the hydrogenation can be effected with platinum in glacial acetic acid, if desired, with the addition of a strong acid, for example, a mineral acid such as hydrohalic acid, for example, hydrobromic acid; or with platinum or palladium/carbon in an organic solvent such as ethanol, hexane, dioxane, or the like, if desired, with the addition of an acid or a base such as an alkali metal hydroxide or an alkaline earth metal hydroxide, for example, potassium hydroxide, sodium hydroxide, or the like. Though noble metal catalysts are preferred, other metal catalysts such as Raney nickel or Raney cobalt are also suitable. For these latter catalysts it is especially suitable to effect the hydrogenation in neutral or alkaline media, for example, a lower alkanol such as ethanol, methanol, or the like, with or without addition of a base such as an alkaline earth metal hydroxide or an alkali metal hydroxide such as potassium hydroxide, sodium hydroxide, or the like. The hydrogenation can be effected at room temperature and normal pressure. If desired, however, it can also be conducted at elevated temperatures and/or elevated pressures.

Besides the above-discussed influence of the stereoconfiguration at the 5-position on the stereospecificity of the hydrogenation of the 9-position of a compound of Formulae II and V, it has been found that hydrogenation of compounds of Formula IV employing platinum in an acid medium, especially in glacial acetic acid, favors the 9$\beta$-configuration, whereas employment of platinum or other noble metal catalysts in a neutral medium results predominantly in the formation of products having the 9$\alpha$-configuration. Moreover, the amount of the catalyst has also been found to effect the selectivity of the hydrogenation. Thus, the greater the amount of, for example, platinum catalyst utilized, the greater the proportion of product containing a 9$\beta$,10$\alpha$-configuration. For example, it was found that the increase of the substance to catalyst weight ratio from 1:1 to 1:5 raises the amount of the 9$\beta$,10$\alpha$-steroid by a factor of 2.

The separation of the hydrogenation products into fractions containing a 10$\alpha$-steroid and fractions containing a 9$\beta$,10$\alpha$-steroid can be effected by conventional means, for example, by crystallization and/or by chromatography, for example, on alumina or silica gel.

As will be readily appreciated, the above-described hydrogenation may also result in reduction of reducible moieties present in the steroidal molecules, for example, in reduction of keto groups in the 3-, 17-, and/or 20-positions. If reduction of reducible groups is undesirable, said groups can be protected prior to the hydrogenation; for example, if reduction of keto groups to hydroxy groups is undesirable, then the keto groups can be protected by effecting ketalization as described above; thus, 3,3: 17,17 - bis-ethylenedioxy - 10$\alpha$ - androsta-4,9 (11)-diene can be subjected to hydrogenation in place of 10$\alpha$-androsta-4,9(11)-diene-3,17 - diene. Alternatively, when the keto groups are not protected and they are converted into hydroxy groups via the hydrogenation, said hydroxy groups can be reconverted into keto groups by a conventional oxidation means, for example, via oxidation with chromium trioxide in an organic solvent, such as glacial acetic acid, dimethylformamide or acetone or by Oppenauer-oxidation. As a further alternative, reducible moieties such as the keto groups can be reduced to non-reducible moieties, e.g., corresponding carbinols, as described above, at some stage in the total reaction sequence prior to the formation of the compounds of Formulae II, IV and V which are subjected to the presently discussed catalytic hydrogenation.

Compounds of Formula V can be prepared by the selective saturation of the $\Delta^4$-double bond of compounds of Formula IV. This selective saturation may be effected by a partial hydrogenation, but is desirably effected by the use of an alkali metal/ammonia reduction means. Thus reduction of the 10$\alpha$-androsta-4,9(11)-dien-3-ones or 10$\alpha$-pregna-4,9(11)-dien-3-ones of Formula IV with an alkali metal/ammonia reduction agent such as lithium/ammonia results in selective reduction of the double bond linking the carbon atoms in the 4- and 5-positions and yields a mixture of 9(11)-en-3-one-5$\alpha$,10$\alpha$-steroids and 9(11)-en-3-one-5$\beta$,10$\alpha$-steroids of Formula V. Said mixture can be separated by conventional means, and the so-obtained products of Formula V can then be subjected to catalytic hydrogenation, as described above.

The third major process technique employed in accordance with this invention is that of dehydration. Thus, compounds of Formula IV can be obtained from compounds of Formulae II or III and compounds of Formula VII can be obtained from compounds of Formula II by dehydration; for example, a 5-hydroxy-10$\alpha$-androst-9(11)-en-3-one or 5-hydroxy-10$\alpha$-pregn-9(11)-en-3-one of Formula II or an isomer thereof of Formula III can be dehydrated to yield a 10$\alpha$-androsta-4,9(11)-dien-3-one or 10$\alpha$-pregna-4,9(11)-dien-3-one of Formula IV. This dehydration can be effected under either basic or acidic catalytic dehydration conditions. Thus, it can be effected in either basic solution or acidic solution. Suitable as base in an organic solvent is, for example, an alkali metal or alkaline earth metal hydroxide or lower alkoxide in a lower alkanol, for example, potassium hydroxide in methanol or sodium ethoxide in ethanol. Especially preferred is an alkali metal or alkaline earth metal lower alkoxide in a lower alkanol. As acidic solutions there can be used, for example, mineral acids or organic acids such as sulfonic acids, e.g., p-benzenesulfonic acid or carboxylic acids, e.g., acetic acid in a solvent, preferably a solvent which forms an azeotrope with water, such as benzene or toluene. The use of acidic conditions, and especially p-toluenesulfonic acid, is preferred because substantial improvements in yield of the dehydration product are obtained when acid rather than basic conditions are employed. The specific catalytic dehydration conditions employed should preferably be chosen so as to have no effect on the substituents in the 6-, 7-, 16- and 17-positions. For example, strongly acidic dehydration conditions (e.g., with a mineral acid such as hydrochloric acid) could be used if the substituents present in these positions were not labile thereto. Of course, labile groups can also be protected against the specific dehydration conditions used.

Compounds of Formula I wherein the 9-hydrogen atom has the 9$\alpha$- or 9$\beta$-configuration, can be prepared by dehydration of a compound of Formula VII in the same manner as described above for the dehydration of a compound of Formulae II or III to a compound of Formula IV. When this dehydration is conducted under alkaline conditions, compounds of Formula I, containing a 7-halo substituent (e.g., chlorine) are converted into the corresponding $\Delta^{4,6}$-unsaturated compound. Thus, for example, from 5 - hydroxy - 7 - chloro-9$\beta$,10$\alpha$-pregnane-3,20-dione there is obtained 9$\beta$,10$\alpha$-pregna-4,6-diene-3,20-dione.

A final process technique of this invention involves the selective dehydrogenation of compounds of Formula VI to compounds of Formula I. This selective 4,5-dehydrogenation can be effected by procedures known to convert cyclohexanone derivatives to the corresponding cyclohexanone and cyclohexadienone derivatives, for example, by treatment of 3-ketosteroids with 2,3-dichloro-5,6-dicyanobenzoquinone in inert organic solvents such as dioxane or benzene at elevated temperature or at room temperature with a catalytic amount of hydrochloric acid. Selenium dioxide in a lower alkanol, preferably in boiling tert.-butanol or benzene or benzene in admixture with acetic acid or pyridine or with a little water may also be used.

Another route to the desired $\Delta^4$-3-ketosteroids involves a two-step sequence of halogenation and dehydrohalogenation. The halogenation of compounds of Formula VI can be effected with halogenating agents such as bromine, sulfuryl chloride or the like. Bromination is especially preferred. The bromination is suitably effected by treatment with bromine at room temperature or below, preferably at ice temperature or below. Suitably it is conducted in an organic medium; for example, an organic acid such as acetic acid; an ether such as an anhydrous ether, dioxane, tetrahydrofuran; a chlorinated organic solvent such as methylene chloride, chloroform, carbon tetrachloride; or the like; with the addition of hydrogen bromide as a catalyst.

The subsequent dehydrohalogenation reaction is preferably conducted under mild dehydrohalogenating conditions; for example, by the use of an alkali metal carbonate (e.g., lithium carbonate) or an alkali metal halogenide (e.g., a lithium halide) in an organic solvent such as a dilower alkyl formamide, or with an organic base such as collidine, pyridine, or the like.

The pharmaceutically useful compounds prepared by the methods of this invention can be administered internally, for example, orally or parenterally, with dosage adjusted to individual requirements. They can be administered in conventional pharmaceutical forms, e.g., capsules, tablets, suspensions, solutions, or the like.

The following examples are illustrative but not limitative of this invention. All temperatures are in degrees centigrade. The Florisil adsorbent used is a synthetic magnesia-silica gel available from the Floridin Company, P.O. Box 989, Tallahassee, Fla. (cf. p. 1590, Merck Index, 7th edition, 1960). 100–200 Mesh material was used.

EXAMPLE 1

To a solution of sodium ethoxide, prepared from 654 mg. of sodium and 630 ml. of absolute ethanol, was added 7.454 g. of 17α-ethyl-17β-hydroxy-desA-androst-9-en-5-one, and after cooling in an ice-salt bath, 7.5 ml. of freshly distilled methyl vinyl ketone was introduced dropwise. The reaction mixture was then kept for 90 hours at −5°. After addition of 2 ml. of glacial acetic acid, the solution was concentrated to a small volume and diluted with 2 liters of ether. The ether solution was washed with 2N sodium carbonate solution, water, dried over anhydrous sodium sulfate and concentrated to dryness in vacuo. The oily residue was chromatographed on a silica gel column. The fractions eluted with 5 and 10 percent ethyl acetate in benzene were combined and gave starting conjugated ketone. The eluates with 20 percent ethyl acetate in benzene gave crystalline 17α-ethyl-5α,17β-dihydroxy-10α-androst-9(11)-en-3-one; M.P. 200–202° after recrystallization from acetone; $[\alpha]_D^{25}$ −4.40° (c.=0.5, methanol).

EXAMPLE 2

A solution of 3.2 g. of 17α-ethyl-5α,17β-dihydroxy-10α-androst-9(1)1-en-3-one in 25 ml. of absolute ethanol was combined with a solution of sodium ethoxide prepared from 0.23 g. of sodium and 25 ml. of absolute ethanol. The reaction mixture was then left for 4 hours at room temperature. Then, after addition of 1 ml. of glacial acetic acid, it was diluted with 1 liter of ether. The ether solution was washed with 2N sodium carbonate solution, with water, then dried over anhydrous sodium sulfate and concentrated to dryness in vacuo. The residue was chromatographed on a silica gel column with 7.5 percent ethyl acetate in benzene.

The crystalline fractions were combined, and after recrystallization from ether, gave 17α-ethyl-17β-hydroxy-10α-androsta-4,9(11)-dien-3-one, M.P. 184.5–185.5°. $[\alpha]_D^{25}$ −134.3° (c.=0.28, methanol).

EXAMPLE 3

To a solution of 4.5 g. of desA-pregn-9-ene-5,20-dione in 150 ml. of absolute ethanol cooled in an ice-salt bath, was first added a solution of 1.15 g. of sodium ethoxide in 70 ml. of absolute ethanol, and then dropwise 4.5 ml. of freshly distilled methyl vinyl ketone. The reaction mixture was left overnight in a refrigerator (i.e., at +2°) the acidified with glacial acetic acid and diluted with a large volume of ether (2 liters). The ether solution was washed with 2 N sodium carbonate solution, water, dried over anhydrous sodium sulfate and concentrated in vacuo. The residue was chromatographed on a silica gel column. The fractions eluted with 3 percent ethyl acetate in benzene were combined and evaporated. The residue was crystallized from ether yielding 10α-pregna-4,9(11)-diene-3,20-dione, M.P. 162–167°. $[\alpha]_D^{25}$=−60° (c.=0.10, dioxane).

The eluates with 10 percent ethyl acetate in benzene gave crystalline 5α-hydroxy-10α-pregn-9,(11)-ene-3,20-dione, M.P. 197–198.5° (after recrystallization from ethyl acetate-petroleum ether); $[\alpha]_D^{25}$ +88° (c.=1, chloroform).

EXAMPLE 4

A suspension of 1.5 g. of platinum dioxide in a solution of 330 mg. of 5α-hydroxy-10α-pregn-9(11)-ene-3,20-dione in 60 ml. of glacial acetic acid was hydrogenated at room temperature and 50 p.s.i. pressure for six hours. The catalyst was removed by filtration, and the filtrate concentrated in vacuo. The crystalline residue was dissolved in 200 ml. of methylene chloride and after addition of 9 ml. 2 percent chromium trioxide in 90 percent acetic acid was stirred at room temperature overnight. It was then diluted with 300 ml. of methylene chloride, and washed with 10 percent aqueous sodium hydrogen sulfite and water, dried over anhydrous sodium sulfate and concentrated in vacuo to dryness. Crystallization of the residue from acetone gives 5α-hydroxy-10α-pregnane-3,20-dione, M.P. 217–220°, $[\alpha]_D^{25}$ +86° (c.=1, methanol).

EXAMPLE 5

A solution of 195 g. of 5α - hydroxy - 10α - pregnane-3,20-dione and one mole equivalent of sodium ethoxide in 30 ml. of absolute ethanol was refluxed for 48 hours. It was acidified with glacial acetic acid and diluted with 1 liter of ether. The cloudy solution was washed with six 50 ml. portions of 2 N sodium carbonate solution, then with water, dried over anhydrous sodium sulfate and concentrated in vacuo to dryness. The crystalline residue was chromatographed on a silica gel column with 3 percent ethyl acetate in benzene to give 10α-progesterone, M.P. 193.5–195° (from ether); $[\alpha]_D^{25}$ −125.6° (c.=0.5, chloroform).

EXAMPLE 6

285 mg. of 10α-androsta-4,9(11)-diene-3,17-dione were dissolved in 20 ml. of glacial acetic acid, mixed with a suspension of 100 mg. of finely divided platinum in 10 ml. of glacial acetic acid and finally hydrogenated at 25° at normal pressure in a hydrogenation apparatus equipped with magnetic stirrer. The hydrogenation was interrupted when 105.8 ml. of hydrogen had been absorbed. The hydrogenated solution was filtered, the filtrate concentrated in vacuo to 5 ml., mixed with a solution of 250 mg. of chromium trioxide in 2.5 ml. of 90 percent glacial acetic acid (in order to effect reoxidation of the hydroxy group now present in both the 3- and 17-positions to a keto group) and the reaction mixture maintained for 2½ hours at 55°. Then 5 ml. of ethanol was added to the mixture which was warmed for a further 10 minutes at 55°, poured into water and extracted 3 times, each time with 50 ml. of benzene. The combined benzene extracts were then washed 5 times, each time with 50 ml. of water, dried over sodium sulfate, filtered, concentrated and evaporated in vacuo at 50° to dryness. The so-obtained oily residue was dissolved in 30 ml. of petroleum ether-benzene (9:1) and chromatographed on a column of 28 g. of aluminum oxide (neutral, activity III). The petroleum ether-benzene (1:2) and (1:4) eluates contained, as established by thin layer chromatographic analysis, the 9α,10α-isomer namely 5α,10α-androstane-3,17-dione. The residue obtained upon evaporation of this eluate yielded crystals of said product which, upon recrystallization from petroleum ether, melted at 133–133.5°. $[\alpha]_D^{25}$ +88° (c.=0.103, dioxane).

The petroleum ether-benzene (1:9) and the benzene eluates, as established by thin layer chromatographic analysis, contained the 9β,10α-isomer, namely,5β,9β,10α-androstane-3,17-dione. The residue is obtained upon evaporation of this eluate, yielded, upon crystalization from acetone-petroleum ether said product in purified form, which melted at 130–131°. $[\alpha]_D^{25}$+48° (C=0.107, dioxane).

EXAMPLE 7

According to the method described in Example 6 above, a mixture of 100 mg. of 10α-androsta-4,9(11)-diene-3,17-dione in 30 ml. of glacial acetic acid with platinum catalyst prepared by hydrogenation of 500 mg. of platinum oxide, was hydrogenated. The hydrogenation was interrupted after 37.2 ml. of hydrogen had been absorbed. The hydrogenated solution was then filtered and the filtrate concentrated to 2 ml. After the addition of 50 mg. of chromium trioxide in 0.5 ml. of 90 percent acetic acid, the mixture was permitted to stand at room temperature for 2½ days. The work-up, according to Example 6, yielded the crude product in the form of an oil which soon crystallized. Through chromatographic purification on 15 g. of aluminum oxide and crystallization as in Example 6, there was obtained 5β,9β,10α-androstane-3,17-dione (melting point 131–132°) and also 5α,10α-androstane-3,17-dione (melting point 133–134°).

EXAMPLE 8

100 mg. of 5α,10α-androst-9(11)-ene-3,17-dione was hydrogenated with platinum in glacial acetic acid and reoxidized with chromium trioxide in 90 percent acetic acid according to the procedure of Example 7. The chromatographic purification and crystallization yielded purified 5α,10α-androstane-3,17-dione and 5α,9β,10α-androstane-3,17-dione.

The 5α,10α-androst-9(11)-ene-3,17-dione employed as the starting material was prepared as follows:

285 mg. of 10α-androsta-4,9(11)-diene-3,17-dione in 30 ml. of ethanol was hydrogenated with the use of 100 mg. of platinum at room temperature and normal pressure. The hydrogenation was interrupted after the absorption of 69.3 ml. of hydrogen. The hydrogenated solution was filtered, the filtrate concentrated to dryness in vacuo, dissolved in 5 ml. of glacial acetic acid and, after the addition of 135 mg. of chromium trioxide, dissolved in 1.35 ml. of 90 percent acetic acid, and then permitted to stand at room temperature for 22 hours. The work-up according to Example 6, yielded a crude product melting at 160–170°, which upon crystallization from acetone-hexane, yielded purified 5α,10α-androst-9(11)-ene-3,17-dione, melting at 174–176°.

EXAMPLE 9

80 mg. of 5β,10α-androst-9(11)-ene-3,17-dione was hydrogenated with platinum in glacial acetic acid and reoxidized as described in Example 7. Chromatography of the resulting crude product yielded, besides 5β,10α-androstane-3,17-dione, 5β,9β,10α - androstane-3,17-dione, which after crystallization from diisopropyl ether melted at 131–132°.

The 5β,10α-androst-9(11)-ene-3,17-dione used as the starting material was prepared as follows:

Under reflux (acetone Dry-Ice condenser) in the course of 3 minutes with stirring, a solution of 500 mg. of 10α-androsta-4,9(11)-diene-3,17-dione in 50 ml. of tetrahydrofuran was added to a solution of 100 mg. of lithium in 100 ml. of liquid ammonia. Thereafter, the resultant reaction mixture was cautiously treated with 5 g. of ammonium chloride, added to 100 ml. of ether and then immediately evaporated at 25°. The residual solution was washed with water, dried over sodium sulfate, filtered and evaporated to dryness in vacuo, whereby a crude amorphous reaction product was obtained. This was chromatographed on 20 g. of aluminum oxide (neutral, activity III). The petroleum ether-benzene (1:1) and (1:2) eluates yielded 5β,10α - androst - 9(11)-ene-3,17-dione which, upon crystallization from hexane melted at 132–134°. The benzene and benzene-ether (9:1) eluates yielded 5β,10α-androst-9(11)-ene-17β-ol-3-one melting at 170–173° (after crystallization from benzene-isopropyl ether), which was employed as the starting material for Example 10.

EXAMPLE 10

100 mg. of 5β,10α-androst-9(11)-ene-17β-ol-3-one was hydrogenated with platinum in glacial acetic acid and reoxidized with chromium trioxide as described in Example 7. The chromatographic purification yielded 5β,9β,10α-androstane-3,17-dione melting at 131–132° after crystallization from acetone-hexane.

EXAMPLE 11

135 mg. of 10α-pregna-4,9(11)-diene-3,20-dione was dissolved in 9 ml. of pure ethanol and added to a prehydrogenated suspension of 200 mg. of palladium/carbon (5 percent) in 5 ml. of ethanol, and the mixture hydrogenated until saturation at room temperature and normal pressure. The absorption of 2 mole equivalents of hydrogen (27 ml. of hydrogen) occurred very quickly in the course of the first 30 minutes. At the end of one hour, the hydrogenation was interrupted and the hydrogenated solution separated from the catalyst and evaporated. Chromatographic separation of the crystalline residue on a column of 11 g. of aluminum oxide (neutral, activity III) yielded in the petroleum ether-benzene (1:4) and (1:2) fractions, 5α,10α-pregnane-3,20-dione which after twice being recrystallized, melted at 164–165°. The petroleum ether-benzene (1:1) and the benzene eluates contained 5β,9β,10α-pregnane-3,20-dione, melting at 125–126°.

EXAMPLE 12

230 mg. of 5α,10α-pregn-9(11)-ene-3,20-dione dissolved in 20 ml. of glacial acetic acid was mixed with a suspension platinum catalyst obtained by hydrogenation of 100 mg. of platinum oxide in 5 ml. of glacial acetic acid, and the mixture then hydrogenated until saturation. The foam obtained after removal of the catalyst by filtration and evaporation of the filtrate was dissolved in 10 ml. of acetone and then, with stirring at 0°, 0.3 ml. of Jones-reagent (J. Chem. Soc. 1946: 39) added thereto. After a reaction time of 4 minutes, the mixture was poured into an ice-sodium bicarbonate mixture and extracted with ether-methylene chloride (3:1) and the organic phase washed until neutral with water. It was then evaporated and the residue chromatographically separated yielding a crystalline residue which upon being twice recrystallized from acetone-hexane, gave purified 5α,10α-pregnane-3,20-dione melting at 164–165°. From subsequent fractions, 5α,9β,10α-pregnane-3,20-dione melting at 105–106° was obtained.

The 5α,10α-pregn-9(11)-ene-3,20-dione used as a starting material was prepared as follows:

313 mg. of 10α-pregna-4,9(11)-diene-3,20-dione dissolved in 20 ml. of ethanol was hydrogenated at room temperature and normal pressure using 100 mg. of platinum. The hydrogenation was terminated after the absorption of 27 ml. of hydrogen. The hydrogenated solution was filtered and evaporated in vacuo to dryness. The crystalline residue melting at 151–156° was established as a single substance by thin-layer chromatography. After several recrystallizations from acetone-hexane, there was obtained 5α,10α-pregn-9(11)-ene-3,20-dione melting at 167–168°.

EXAMPLE 13

50 mg. of 5β,10α-pregn-9(11)-ene-3,20-dione was hydrogenated with platinum in glacial acetic acid and reoxidized as described in Example 7. Chromatography of the so-obtained crude product yielded 5β,9β,10α-pregnane-3,20-dione which, upon crystallization from methylene chloride-isopropyl ether, melted at 125°. There was also obtained 5β,10α-pregnane-3,20-dione.

The 5β,10α-pregn-9(11)-ene-3,20-dione used as the starting material was prepared as follows:

Under reflux (acetone Dry-Ice condenser) in the course of 3 minutes with stirring, a solution of 200 mg. of 10α-pregna-4,9(11)-diene-3,20-dione in 28 ml. of ether-dioxane (1:1) was added to a solution of 150 mg. of lithium in 100 ml. of liquid ammonia. After a half hour the blue-colored reaction mixture was cautiously treated with 5 g. of ammonium chloride, added to 150 ml. of ether and then immediately evaporated at 25°. The residual solution was washed with water, dried over sodium sulfate, filtered and evaporated to dryness in vacuo. The resulting oily crude product was oxidized with 0.17 ml. of Jones-reagent in 4 ml. of acetone at 0° and after the usual work-up, the resulting crystals were chromatographed on 9 g. of aluminum oxide (neutral, activity III). The hexane-benzene (4:1) eluate yielded, at first, 5α,10α-pregn-9(11)-ene-3,20-dione. The more polar eluates yielded 5β,10α-pregn-9(11)-ene-3,20-dione which after crystallization from acetone-hexane melted at 176–178°.

EXAMPLE 14

314 mg. of 17α-ethyl-10α-Δ$^{9(11)}$-testosterone were dissolved in 31 ml. of glacial acetic acid and hydrogenated according to the method described in Example 6 above, using 300 mg. of platinum catalyst. The crude hydrogenation product was then treated with chromium trioxide as described in Example 6 above. Chromatography of the reaction product on alumina gave 17α-ethyl-5β,9β,10α-androstan-17β-ol-3-one, M.P. 123–124°, $[\alpha]_D^{25}$=−47° (dioxane), 17α-ethyl-5α,10α-androstan-17β-ol-3-one, M.P. 124–125°, $[\alpha]_D^{25}$=+5° (dioxane) and a small amount of 17α - ethyl - 5α,9β,10α-androstan-17β-ol-3-one, M.P. 204–205°, $[\alpha]_D^{25}$=−19° (dioxane).

EXAMPLE 15

To a well stirred solution of 1.9 g. of 5β,9β,10α-pregnane-3,20-dione in 20 ml. of acetic acid, which contained 0.5 ml. of 33 percent HBr in acetic acid, was added within 5 minutes a solution of 1.056 g. of bromine in 10 ml. of acetic acid. The reaction mixture was stirred for another 10 minutes, then diluted with 50 ml. of ice water. The crystalline precipitate was filtered off, washed with water and dried in vacuo at room temperature. After recrystallization from ethylacetate the 2β-bromo-5β,9β,10α-pregnane-3,20-dione melted at 160–161°.

1.5 g. of this substance was dissolved in 40 ml. of dimethylformamide. After the addition of 1.5 g. of lithium chloride and 1.5 g. of lithium carbonate the mixture was heated to reflux under nitrogen for 2 hours. Water was then added and the organic material extracted with ether. The extract was washed with water, dried with sodium sulfate and evaporated to dryness. The residue was chromatographed on silicagel. With benzene-acetone (99:1) 800 mg. of 5β,9β,10α-pregn-1-ene-3,20-dione, M.P. 91–93°, were eluted. Further elution with benzene-acetone (98:2) afforded 250 mg. of 9β,10α-pregn-4-ene-3,20-dione, M.P. 155–157° (from ethanol).

EXAMPLE 16

To a stirred solution of 1.9 g. of 5α,9β,10α-pregnane-3,20-dione in 20 ml. of acetic acid, which contained 10 drops of 33 percent HBr in acetic acid, a solution of 0.96 g. of bromine in 10 ml. of acetic acid was dropped within 5 minutes. The solution was stirred for another 10 minutes, then diluted with ice water and extracted with ether. The ether solution was washed with cold sodium bicarbonate solution and water, dried with sodium sulfate and evaporated to dryness. The residue was chromatographed on silicagel. The benzene-acetone (99:1) fractions afforded 890 mg. of 4-bromo-5α,9β,10α-pregnane-3,20-dione, M.P. 141–143°.

A solution of 200 mg. of this substance, 200 mg. of lithiumchloride and 200 mg. lithium carbonate in 5 ml. of dimethyl formamide was refluxed for 2 hours. After dilution with water the mixture was extracted with ether. The ether extract afforded a crystalline residue which gave after crystallization from ethanol 9β,10α-pregn-4-ene-3,20-dione, M.P. 154–156°.

EXAMPLE 17

636 mg. of 17α - ethyl - 17β - hydroxy - 5β,9β,10α - androstane-3-one was dissolved in 8 ml. of acetic acid. To the well stirred solution one drop of 33 percent HBr in acetic acid, and immediately afterwards a solution of 352 mg. of bromine and 190 mg. of sodium acetate in 10 ml. of acetic acid was added within 15 minutes. The reaction mixture was stirred for another 15 minutes and then diluted with water. The crystalline precipitate was filtered off and dried in vacuo.

This crude 2β-bromo-17α-ethyl-17β-hydroxy-5β,9β,10α-androstane-3-one was dissolved in 10 ml. of dimethylformamide. After addition of 600 mg. of lithium chloride and 600 mg. of lithium carbonate the solution was heated to reflux for 2 hours. The mixture was then diluted with water and extracted with ether. The crude product isolated from the ether extract was chromatographed on aluminum-oxide of activity II. The benzene-petroleum ether (1:1) eluates contained the 17α-ethyl-17β-hydroxy-5β,9β,10α-androst-1-ene-3-one, whereas the benzene-petroleumether (2:1) fractions yielded the 17α-ethyl-17β-hydroxy-9β,10α-androst-4-ene-3-one, M.P. 131–133°.

EXAMPLE 18

To a stirred solution of 200 mg. of 5α10α-pregnane-3,20-dione in 5 ml. of acetic acid was added 1 drop of 33 percent HBr in acetic acid. A solution of 108 mg. of bromine in 5 ml. of acetic acid was added within 10 minutes. The mixture was stirred for another 15 minutes, then diluted with ice water and extracted with ether. The extract was washed with NaHCO$_3$-solution and water, dried over sodium sulfate and concentrated. There was obtained 257 mg. of a yellow oil. This material was dissolved in 10 ml. of dimethylformamide. After addition of 260 mg. of lithium chloride and 260 mg. of lithium carbonate the mixture was heated to reflux for 2 hours. After the workup the residue (205 mg.) was chromatographed on silicagel. The first fractions yielded 5α,10α-pregn-1-ene-3,20-dione, M.P. 180–183° (from acetone-hexane). The latter fractions afforded 10α-pregn-4-ene-3,20-dione.

EXAMPLE 19

0.2 ml. of 11 percent hydrobromic acid in acetic acid and a solution of 2 mmoles bromine in 1 ml. of acetic acid were added within 3 minutes at 5° under stirring to a solution of 305 mg. of 5α,10α-pregnane-3,20-dione in 6 ml. of acetic acid. The solution was kept at room temperature for 40 minutes, then poured on ice and extracted with methylenechloride. The organic phase was washed three times with water, dried over sodium sulfate and evaporated. This crude bromination product was refluxed for 2 hours in 10 ml. of acetone and 500 mg. of sodium iodide, then poured on ice and extracted with methylenechloride. The methylenechloride layer was washed once with an aqueous sodium thiosulfate solution and three times with water, dried over sodium sulfate and evaporated. 150 mg. of an oily residue was obtained which was refluxed for 1½ hours with 5 ml. of dimethylformamide, 200 mg. of lithium carbonate and 200 mg. of lithium bromide. Chromatography on silicagel of the crude dehydrobromination product yielded 10α-progesterone M.P. 193.5–195° (from acetone-hexane).

EXAMPLE 20

200 mg. of 17α-ethyl-17β-acetoxy-5α,9β,10α-androstane-3-one and 150 mg. of 2,3-dichloro-5,6-dicyanobenzoquinone dissolved in a mixture of 10 ml. of benzene and 10 ml. of dioxane, containing 29 mg. of hydrogenchloride, was stirred at room temperature for 40 minutes. The reaction mixture was then neutralized with 90 mg. of calciumcarbonate and refluxed for 15 minutes. The mixture was poured on ice, extracted with ether-methylene chloride 3:1, the organic phase was washed once with 2 N sodium hydroxide solution, then with water until neutral, and dried over sodium sulfate. The residue obtained after evaporation of the solvent was chromatographed on silicagel with isopropyl-ether. After elution of 107 mg. of starting material, 17α-ethyl-17β-acetoxy-9β,10α-androst-4-ene-3-one was isolated, which melted after recrystallization from acetone-hexane at 182–184°.

An ethereal solution of 17α-ethyl-17β-acetoxy-9β,10α-androst-4-ene-3-one was stirred with an equal amount of lithium-aluminum-hydride at room temperature for 90 minutes. The unreacted reagent was decomposed with some drops of water and the precipitation removed by filtration. The filtrate was evaporated to dryness, the residue obtained redissolved in chloroform and treated at room temperature for one hour with a large excess of manganese dioxide. The reaction mixture was diluted with ether and the organic phase washed with water, dried over sodiumsulfate and evaporated. The partially crystalline 17α-ethyl-17β-hydroxy-9β,10α-androst-4-ene-3-one melted after several recrystallizations from acetone-ether at 131–133°.

EXAMPLE 21

A solution of 200 mg. of 17α-ethyl-17β-hydroxy-5β,9β,10α-androstane-3-one and 100 mg. of N-bromo-succinimide in 15 ml. of carbontetrachloride was refluxed and irradiated with a high pressure mercury lamp for 25 minutes. The reaction mixture was diluted with ether, washed once with 2 N sodium hydroxide solution, then with water until neutral, dried over sodium sulfate and evaporated to dryness. The residue (280 mg.) was redissolved in 20 ml. of dimethylformamide and refluxed under nitrogen for 2 hours with 180 mg. of lithium carbonate and 180 mg. of lithium bromide. Water was then added and the organic material extracted with ether, the ethereal solution dried over sodium sulfate and evaporated to dryness. Chromatography of the residue on silicagel with cyclohexane-ethyl-acetate (1:1) yielded, after elution of starting material and 17α-ethyl-17β-hydroxy-5α,9β,10α - androst-1-ene-3-one, 17α-ethyl-17β-hydroxy-9β,10α-androst-4-ene-3-one, M.P. 131–133°.

EXAMPLE 22

17α - ethyl - 17β-hydroxy-5α,10α-androstane-3-one was brominated and dehydrobrominated as described in Example 21. From the crude reaction product 17α-ethyl-17β-hydroxy - 5α,10α - androst-1-ene-3-one and 17α-ethyl-17β-hydroxy-10α-androst-4-ene-3-one (M.P. 213–214°) were isolated by chromatography on silicagel with isopropyl ether.

EXAMPLE 23

17α-ethyl-5α,17β-dihydroxy-10α-androstan-3-one is prepared from 17α - ethyl - 5α,17β-dihydroxy-10α-androst-9(11)-en-3-one by hydrogenation of the latter in the presence of a platinum catalyst according to the procedure of Example 4.

EXAMPLE 24

17α-ethyl-10α-testosterone is prepared from 17α-ethyl-5α,17β-dihydroxy-10α-androstan-3-one by dehydration of the latter according to the procedure of Example 5.

EXAMPLE 25

5α,17β - dihydroxy - 10α-androst-9(11)-en-3-one is prepared from 17β-hydroxy-desA-androst-9-en-5-one by condensation of the latter with methyl vinyl ketone according to the procedure of Example 1.

EXAMPLE 26

5α,17β-dihydroxy-10α-androstan-3-one is prepared from 5α,17β-dihydroxy-10α-androst-9(11)-en-3-one by hydrogenation of the latter in the presence of a platinum catalyst according to the procedure of Example 4.

EXAMPLE 27

10α-testosterone is prepared from 5α,17β-dihydroxy-10α-androstan-3-one by dehydration of the latter according to the procedure of Example 5.

EXAMPLE 28

4 - methyl - 17α - ethyl-5α,17β-dihydroxy-10α-androst-9(11)-en-3-one is prepared by condensation of 17α-ethyl-17β - hydroxy - desA-androst-9-en-5-one with ethyl vinyl ketone according to the procedure of Example 1.

EXAMPLE 29

4 - methyl - 17α - ethyl - 17β - hydroxy - 10α-androst-4,9(11)-dien-3-one is prepared from the 4-methyl-17α-ethyl - 5α,17β-dihydroxy-10α-androst-9(11)-en-3-one obtained according to Example 20 by dehydration of the latter according to the procedure of Example 2.

EXAMPLE 30

4β - methyl - 17α-ethyl-5β,9β,10α-androstan-17β-ol-3-one and 4α-methyl-17α-ethyl-5α,9β,10α-androstan-17β-ol-3-one are prepared from 4-methyl-17α-ethyl-17β-hydroxy-10α-androsta-4,9(11)-dien-3-one by hydrogenation of the latter in the presence of a platinum catalyst according to the procedure of Example 14.

EXAMPLE 31

5α - hydroxy - 10α-androst-9(11)-ene-3,17-dione is prepared from desA-androst-9-en-5,17-dione by condensation of the latter with methyl vinyl ketone according to the procedure of Example 1.

EXAMPLE 32

10α-androsta-4,9(11)-diene-3,17-dione is prepared from 5α - hydroxy - 10α-androst-9(11)-ene-3,17-dione by dehydration of the latter according to the procedure of Example 2.

EXAMPLE 33

To a solution of 11.71 grams of 17β-hydroxy-desA-androst-9-en-5-one in 250 milliliters of tetrahydrofuran under argon there was added 50 milliliters of a 1 N methanolic sodium methoxide solution. The resulting mixture was stirred at room temperature for 10 minutes. The solution was then cooled to −10° and over one hour was treated dropwise with a solution of 10.5 grams of methyl vinyl ketone in 20 milliliters of tetrahydrofuran. The resulting mixture was stirred at −7° C. for 16 hours and then poured into 500 milliliters of ice water. After extraction with 600 milliliters of a 5:1 ether-methylene chloride mixture, the aqueous phase was extracted twice with 500 milliliters of 5:1 ether-methylene chloride. The organic phases were washed three times with 500 milliliters of water and then dried over sodium sulfate. The solvents were evaporated off and the resulting oil was dried under high vacuum to obtain a mixture of 5α,17β-dihydroxy-10α - androst - 9(11)-en-3-one and 3,17β-dihydroxy-4,5-seco-3,6β-cyclo-10α-androst-9(11)-en-5-one. This crude product was dissolved in 100 milliliters of benzene, adsorbed on a Kieselgel column and eluted with benzene-acetone. There was obtained a first 1000-milliliter fraction, thirty-five intermediate fractions of 500 milliliters each and a final 1500-milliliter fraction. The first twenty-five fractions were eluted with 10:1 benzene-acetone, the next eleven with 8:1 benzene-acetone, and the final fraction with acetone alone.

Fractions 14–17 were combined and evaporated under high vacuum to yield a yellow crystalline product which contained about 70 percent 3,17β-dihydroxy-4,5-seco-3,6β-cyclo-10α-androst-9(11)-en-5-one, as determined by infrared and nuclear magnetic resonance spectra.

Fractions 18–36, after combination and evaporation, were found to contain a mixture of 3,17β-dihydroxy-4,5-seco-3,6β-cyclo-10α-androst-9(11)-en-5-one and 5α,17β-dihydroxy-10α-androst-9(11)-en-3-one in a ratio of about 1.6:1.

EXAMPLE 34

A solution of a 608-milligram portion of the crude 3,17β - dihydroxy-4,5-seco-),6β-cyclo-10α-androst-9(11)-en-5-one produced as described in Example 33 (Fractions 14–17) in 70 milliliters of benzene was heated to 60–70° under nitrogen, treated with 77 milligrams of p-toluenesulfonic acid monohydrate and then heated to boiling. Water was removed as an azeotrope. Over 2½ hours there were removed 80 milliliters of benzene. The reaction volume was maintained by the addition of fresh benzene. The reaction solution was cooled, poured into 250 milliliters of ice cold approximately half-saturated sodium bicarbonate solution and then extracted 3 times with 400 milliliters of ether. The organic phases were washed twice with 250 milliliters of ice cold 1 N potassium hydroxide and 3 times with water. After drying over sodium sulfate and evaporating to dryness under vacuum, there was obtained 17β-hydroxy-10α-androsta-4,9(11)-dien-3-one.

EXAMPLE 35

Employing procedures similar to those described in Example 34 but substituting 608 milligrams of the mixture obtained as Fractions 18–36 in Example 33, there was obtained 17β-hydroxy-10α-androsta-4,9(11)-dien-3-one.

EXAMPLE 36

A 3.0-gram portion of the crude 3,17β-dihydroxy-4,5-seco-3,6β-cyclo-10α-androst-9(11)-en-5-one obtained as Fractions 14–17 as described in Example 33 was dissolved in ether-methylene chloride and filtered. After evaporation of the ether, the product was crystallized from methylene chloride-hexane, washed with methylene chloride-hexane, vacuum dried, and again crystallized from methylene chloride-hexane. The thus-purified product, obtained in the form of white needles, melted at 174–176° C. Employing procedures similar to those described in Example 34, the purified product was treated with p-toluene-sulfonic acid monohydrate to produce 17β-hydroxy-10α-androsta-4,9(11)-dien-3-one.

The desA-androst-9-en-5-one and desA-pregn-9-en-5-one starting materials are, as stated above, not a part of this invention, but their preparation is disclosed hereinbelow in order that this disclosure may be complete.

As indicated above, the desA-androst-9-en-5-ones or desA-pregn-9-en-5-ones of Formula VIII can be prepared from natural steroids by a variety of methods. Thus, in one embodiment said desA-androst-9-en-5-ones or desA-17β-pregn-9-en-5-ones can be prepared from steroids of the androstane or 17β-pregnane series by a reaction sequence which involves as a first step an oxidative ring opening of ring A of the natural steroid. For this oxidative ring opening there can be used as starting materials, natural steroids of the 3-oxo-androst-4-ene or 3-oxo-17β-pregn-4-ene series of the formula:

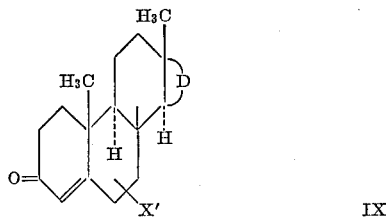

IX wherein X' is a substituent in the 6-position selected from the group consisting of hydrogen, lower alkyl, lower alkylthio and lower alkanoylthio or a substituent in the 7-position selected from the group consisting of hydrogen, lower alkyl, lower alkylthio, lower alkanoylthio and halogen, and D has the same meaning as above.

The oxidative ring opening of a natural steroid of Formula IX yields a 5-oxo-3,5-seco-A-norandrostan-3-oic acid or a 5-oxo-3,5-seco-A-norpregnan-3-oic acid of the formula

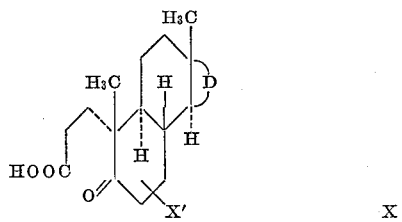

X wherein X' and D have the same meaning as above.

The oxidative ring opening of the compound of Formula IX can be performed by a variety of methods. In a preferred embodiment it is effected by ozonolysis. The ozonolysis is suitably carried out in an organic solvent, for example, acetic acid, ethyl acetate, methanol, chloroform, methylene chloride, or the like, or a mixture of two or more of such solvents such as ethyl acetate/acetic acid, ethyl acetate/methylene chloride, or the like. Moreover, the ozonolysis is advantageously conducted at below room temperature. Thus, it is preferably conducted at a temperature between about —70° C. and about 25° C. The resulting ozonides can be decomposed by conventional means, for example, by treatment with water; hydrogen peroxide in water, acetic acid or ethyl acetate, or the like. The oxidative ring opening of a compound of Formula IX to a compound of Formula X can also be effected by other oxidation means, for example, by treatment with hydrogen peroxide. It should be noted that an oxidative ring opening by either ozonolysis or by treatment with hydrogen peroxide, does not require protection of any of the substituents as C–16 or C–17. However, as stated above, it may be desirable to protect these substituents against some subsequent reaction in the total reaction sequence being practiced. On the other hand, the oxidative ring opening can also be effected by oxidation with chromium trioxide or via treatment with sodium periodate and potassium permanganate in potassium carbonate solution and if these oxidation means are used, it is necessary to protect any secondary hydroxy groups which might be present such as a 16,17β- or 21-hydroxy group; preferably, for the purpose of this reaction, with non-aromatic protecting groups.

Following the oxidative ring opening of the A-ring, the so-obtained 5-oxo-3,5-seco-A-norandrostan-3-oic acid or 5-oxo-3,5-seco-A-norpregnan-3-oic acid of Formula X is converted into a mixture of a 10α-desA-androstan-5-one and a 10β-desA-androstan-5-one or a mixture of a 10α-desA-pregnan-5-one and a 10β-desA-pregnan-5-one as illustrated below:

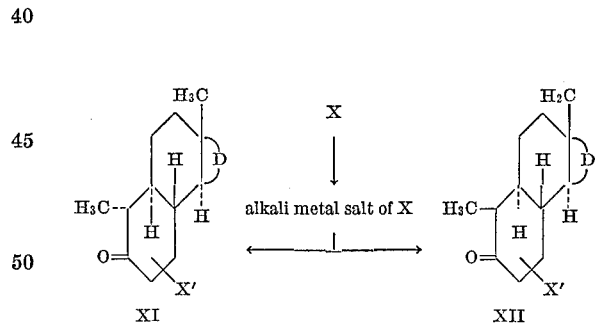

wherein Formulae XI and XII, X' and D have the same meaning as above.

The compounds of Formula XI are 10α-desA-androstan-5-ones or 10α-desA-pregnan-5-ones, depending on the meaning of D, and the compounds of Formula XI are 10β-desA-androstan-5-ones or 10β-desA-pregnan-5-ones. The conversion of a compound of Formula X into the compounds of Formula XI and XII is effected by pyrolysis. Prior to effecting the pyrolysis, it is desirable to convert the 3-oic acid of Formula X into a corresponding metal salt, for example, an alkali metal salt such as the sodium salt. The pyrolysis is suitably conducted in a vacuum at a temperature from about 200° C. to about 350° C. in the presence of a proton acceptor, e.g., an alkali metal or alkaline earth metal salt of a weak organic acid, for example, potassium acetate, sodium acetate, sodium phenylacetate, or the like. Accordingly, it is advantageous to conduct the pyrolysis under alkaline conditions, i.e., at a pH greater than 7.

In another aspect, compounds of Formula XI can be prepared from compounds of the formula

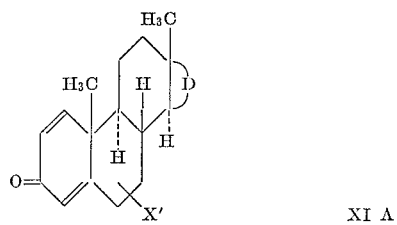   XI A wherein X' and D have the same meaning as above.

The compounds of Formula XI can be prepared from compounds of Formula XI A in the same manner that compounds of Formula XI are prepared from compounds of Formula IX, i.e., by oxidative ring opening of the A-ring of a compound of Formula XI A followed by elimination of the residue of the A-ring, to yield a compound of Formula XI. The oxidative ring opening of the compound of XI A can be performed by ozonolysis as described above for the conversion of a compound of Formula IX A to a compound of Formula X. Such ozonolysis of a compound of Formula XI A yields a compound of the formula

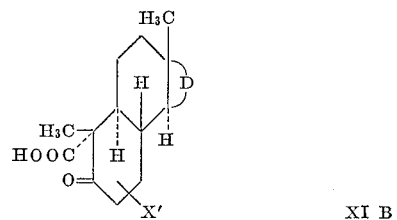   XI B wherein X' and D have the same meaning as above.

A compound of Formula XI B can then be converted to a compound of Formula XI. This removal of the residue of the A-ring, i.e., decarboxylation, can be effected as described above by pyrolysis.

Compounds of Formula XI can also be formed from a compound of Formula X via the formation of an enol-lactone of a compound of Formula X, i.e., via the formation of a 4-oxoandrost-5-en-3-one or a 4-oxo-pregn-5-en-3-one of the formula:

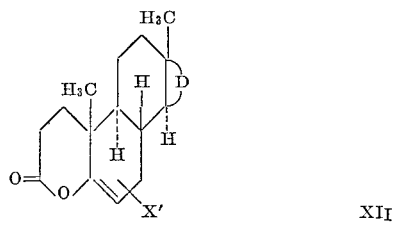   XII wherein X' and D have the same meaning as above, which can then be reacted with a Grignard reagent, such as phenyl magnesium bromide or phenyl lithium, to form the resulting aldol of, for example, the formula

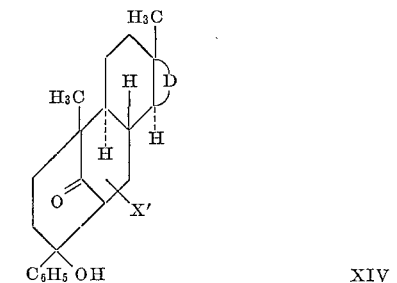   XIV wherein X' and D have the same meaning as above, which, upon treatment with an alkali metal hydroxide, such as potassium hydroxide, at an elevated temperature, for example, from about 200° C. to about 240° C., is converted to the corresponding 10α-desA-androstan-5-one or 10α-desA-pregnan-5-one of Formula XI.

It should be noted that though the prolysis of a compound of Formula X yields both the 10β-compounds of Formula XI and the 10α-compounds of Formula XII and though either of these isomers can be used in the subsequent halogenation and dehydrohalogenation steps of this reaction sequence, it is sometimes preferable to convert the 10β-compound of Formula XII into the corresponding 10α-compound of Formula XI. This conversion can effected by treating a 10β-desA-androstan-5-one or 10β-desA-pregnan-5-one of Formula XII with any base capable of producing a carbanion; for example, it is suitable to use an alkali metal lower alkoxide in an organic solvent such as a lower alkanol, for example, sodium ethoxide in an ethanol solution or sodium methoxide in a methanol solution.

The above discussed conversion via the alkali metal salt and prolysis of compounds of Formula X to compounds of Formulae XI and XII can be effected without protection of any of the substitutents which might be present at C-16 or C-17. However, if it is desired for either preceding or succeeding reaction steps of the total reaction sequence, the conversion of a compound of Formula X to compounds of Formulae XI and XII can be effected with protecting groups present on substituents in the C-16 or C-17 position.

The 10α-desA-androstan-5-ones or 10α-desA-pregnan-5-ones of Formula XI or the 10β-desA-androstan-5-ones of 10β-desA-pregnan-5-ones of Formula XII can be converted via a two-step sequence of halogenation and dehydrohalogenation into the desired starting material desA-androst-9-en-5-one or desA-pregn-9-en-5-one of Formula VIII.

In one embodiment a 10α-desA-androstan-5-one or a 10α-desA-pregnan-5-one of Formula XI is subjected to the two-step sequence of halogenation and dehydrohalogenation. Halogenation of a compound of Formula XI or a compound of Formula XII yields a mixture of corresponding halgenated compounds including one of the formula

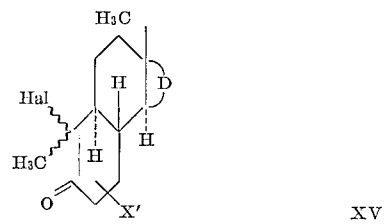   XV wherein X' and D have the same meaning as above, and Hal is a halogen atom (preferably Br or Cl).

Dehydrohalogenation of a compound of Formula XV then yields a desired starting material of Formula VIII. Keto groups, except for the 5-keto group, may required protection prior to the halogenation. In the case of compounds of Formulas XI and XII containing the C-17 dihydroxy-acetone side chain, represented in Formula III wherein $R_6$ is hydroxy, this protection can be effected by formation of the 17α,20; 20,21-bis-methylenedioxy derivative. In other cases wherein a C-17 oxo or C-20 oxo group is present, protection can be effected by reduction to the corresponding carbinol either directly prior tot he halogenation step or prior to some othe step in the reaction sequence leading to the compounds of Fomulas XI and XII.

The halogenation can be effected with halogenating agents such as bromine, sulfuryl chloride, or the like. Bromination is especially preferred. The bromination is suitably effected by treatment with bromine at room temperature or below, preferably at ice temperature or below. Suitably it is conducted in an organic medium; for example, an organic acid such as acetic acid; an ether such as an anhydrous ether, dioxane, tetrahydrofuran; a chlorinated organic solvent such as methylene chloride, chloroform, carbon tetrachloride; or the like; with or without the addition of hydrogen bromide as a catalyst.

The subsequent dehydrohalogenation of a compound of a compound of Formula XV is preferably conducted under mild dehydrohalogenating conditions; for example, by the use of an alkali metal carbonate (e.g., lithium carbonate) or an alkali metal halogenide (e.g., a lithium halide) in an organic solvent such as a di-lower alkylformamide, or with an organic base such as collidine, pyridine, or the like. The dehydrohalogenation is advantageously conducted at slightly elevated temperatures, for example, from about 50° C. to about 150° C., preferably from about 80° C. to about 120° C.

Separation of the desired product desA-androst-9-en-5-one or desA-pregn-9-en-5-one of Formula VIII can be effected by conventional means. It is preferably effected after first subjecting the reaction mixture to dehalogenating conditions whereby to dehalogenate the halogenated compounds formed by the halogenation procedure, but not effected by the dehydrohalogenation. Following such dehalogenation the reaction mixture can then easily be separated by conventional means, for example, by column chromatography, to yield the desired compound of Formula VIII. An exemplary dehalogenation means is treated with zinc and sodium acetate in an acetic acid solution at an elevated temperature, for example, about 80° C.

In the case of compounds of Formula XI or XII which contain a halogen atom on a carbon atom directly adjacent to a keto group, it is preferable to protect such a halogen atom against dehalogenation prior to subjecting the compound of Formulas X or XII to the two step sequence of halogenation and dehydrohalogenation of this embodiment. Such a grouping, containing a halogen atom on a carbon atom, directly adjacent to a keto group, is illustrated in a compound of Formula II or III wherein $R_5$ or $R_6$ is halogen. Thus, if $10\alpha$- or $10\beta$-desA-pregnan-5-one of Formulas XI or XII containing a $17\alpha$- or 21-halo substituent is to be subjected to the halogenation dehydrohalogenation sequence it is desirable to first effect protection of the $17\alpha$- or 21-halo substituent. This protection can be effected, for example, by ketalization of the 20-oxo group.

The desired desA-androst-9-en-5-ones or desA-pregn-9-en-5-ones starting materials can also be prepared from steroids of the 3-oxo-androst-4-ene or 3-oxo-17$\beta$-pregn-4-ene series containing an 11-hydroxy substituent. In one embodiment an 11-hydroxy steroid of the formula

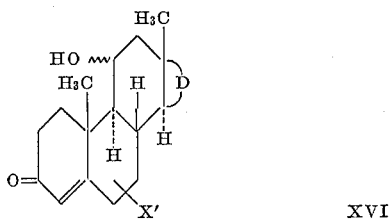

XVI wherein X and D have the same meaning as above, is reacted with an acid or a reactive derivative thereof to form a leaving group in the 11-position. By reactive derivative is meant, for example, a halide, e.g. a chloride, an anhydride, or the like. Though either 11$\beta$- or 11$\alpha$-hydroxy starting materials can be used, it is preferable to utilize $\alpha$-hydroxy compounds of Formula XVI as starting materials. Prior to the esterification reaction, it is preferable to protect hydroxy groups present in the C-16, C-17, or C-21 position. Suitable acids for the esterification of the 11-hydroxy group, which can be used to form a leaving group in the 11-position, are inorganic acids such as phosphoric acid, organic carboxylic acids such as anthraquinone $\beta$-carboxylic acid or organic sulfonic acids, for example, toluene-sulfonic acids, especially p-toluene sulfonic acid, lower alkyl-sulfonic acids such as methane-sulfonic acid and nitrophenyl-sulfonic acids, especially p-nitrophenylsulfonic acid. Especially preferred as the leaving group in the 11-position is a lower alkylsulfonyloxy group such as the mesoxy group. The above described esterification of 11-hydroxy steroid starting material of Formula XVI yields compounds of the Formula

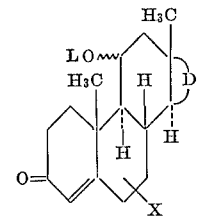

XVII wherein X and D have the same meaning as above, and LO represents the leaving group.

In the next step of this reaction sequence, the so-formed 11-(esterified hydroxy)-compound of Formula XVII is subjected to an oxidative ring opening of the A-ring to yield the corresponding 11-(esterified hydroxy) - 5 - oxo-3,5-seco-A-norandrostan-3-oic and or 11-(esterified hydroxy) - 5-oxo-3,5-seco-A-norpregnan-3-oic acid of the formula

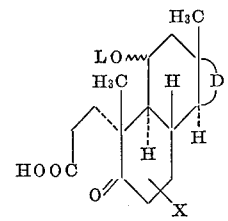

XVIII wherein X, D and LO have the same meaning as above.

The oxidative ring opening of the A-ring of a compound of Formula XVII to a compound of Formula XVIII can be effected by ozonolysis as described above for the oxidative ring opening of the A-ring of a compound of Formula IX to a compound of Formula X. Pyrolysis of the so-formed compound of Formula XVIII under the conditions described above for the pyrolysis of a compound of Formula X to compounds of the Formulas XI and XII directly yields the desired desA-androst-9-en-5-one or desA-pregn-9-en-5-one of Formula XIII. Thus, pyrolysis of a compound of Formula XVIII directly results in elimination of the leaving group in the 11-position as well as a splitting off of the residue of ring A attached to the 10-position. This procedure of starting from an 11-hydroxy steroid (preferably 11$\alpha$-hydroxy) of Formula XVI and proceeding through intermediates of Formulas XVII and XVIII to compounds of Formula VIII represents a particularly elegant procedure for preparing the latter compounds.

In yet another embodiment of this invention starting material 11-hydroxy steroids of Formula XVI can be directly subjected to an oxidative ring opening of the A-ring by ozonolysis or treatment with hydroxide peroxide, as described above for the oxidative ring opening of the A-ring of a compound of Formula IX to a compound of Formula X. This oxidative ring opening of the A-ring of a compound of Formula XVI yields an 11-hydroxy-5-oxo-3,5-seco-A-norandrostan-3-oic acid 3,11-lactone or an 11-hydroxy-5-oxo-3,5-seco-A-norpregnan-3-oic acid 3,11-lactone of the formula

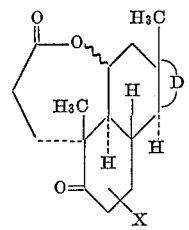

XIX wherein X and D have the same meaning as above.

Treatment of the 3,11-lactone of Formula XIX with an alkali metal hydroxide such as sodium hydroxide gives the salt of the same keto acid. Without isolation, this salt can then be subjected to pyrolysis yielding a mixture of an 11-hydroxy-10α-desA-androstan-5- one and an 11-hydroxy-10β-desA-androstan-5-one or a mixture of an 11-hydroxy-10α-desA-pregnan-5-one and an 11-hydroxy-10β-desA-pregnan-5-one, as illustrated below:

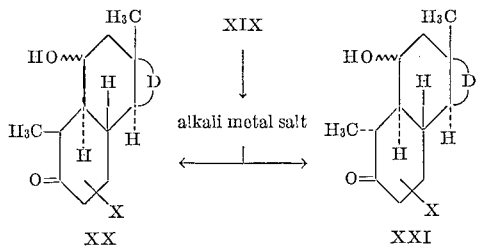

wherein in Formulas XX and XXI, X and D have the same meaning as above.

This pyrolysis of an alkali metal salt of a compound of Formula XIX can be effected under the same conditions as described above for the pyrolysis of a compound of Formula X to compounds of the Formulae XI and XII. Though either the 10β-compound of Formula XX or the 10α-compound of Formula XXI can be subjected to the subsequent steps of this reaction sequence, it is preferable to utilize the 10β-compound of Formula XX. Conversion of the 10α-compound of Formula XXI to the 10β-compound of Formula XX can be effected under the same conditions as described above for the conversion of the compound of Formula XII to a compound of Formula XI.

In the next step of this reaction sequence, the 11- hydroxy compound of Formula XX or of Formula XXI can be subjected to esterification whereby to convert the 11-hydroxy group to a leaving group in the 11-position. This esterification can be effected with the same acids or acid derivatives and in the same manner as described above for the esterification of a compound of Formula XVI to a compound of Formula XVII. As in that instance, it is also preferred in the present instance to form a mesoxy leaving group in the 11-position, though, of course, other leaving groups as described above are useful for the instant purpose. There is thus obtained a compound of the formula

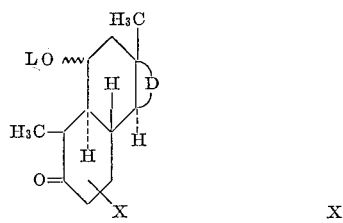

wherein X, D and LO have the same meanings as above.

The leaving group can then be eliminated from the 11-position of a compound of Formula XXII resulting in a direct formation of a desA-androst-9-en-5-one or a desA-pregn-9-en-5-one of Formula VIII. This elimination can be effected by any conventional elimination means. It is suitably conducted under alkaline conditions in an anhydrous organic solvent. Preferably, it is effected by heating, i.e., at a temperature between about room temperature and the reflux temperature of the reaction mixture. Thus, treatment of a compound of Formula XXII with either an inorganic or organic base results in the formation of the desired compound of Formula VIII. Preferably, a weak base is used, for example, a salt of a carboxylic acid (e.g., a lower alkanoic acid) with an alkali metal or an alkaline earth metal, for example, sodium acetate, potassium acetate, or the like. As indicated, the elimination is suitably conducted in an anhydrous organic solvent; suitable are solvents such as dilower alkyl formamides, e.g. dimethyl formamide, lower alkanoic acids, e.g. acetic acid, or the like. When a proton accepting solvent, such as dimethyl formamide, is used, it itself can serve as the base for the purpose of this elimination reaction; i.e., if the solvent is basic then the elimination can be conducted without the addition of a separate basic material.

The following examples more specifically exemplify the preparation of the desA-androst-9-en-5-one and desA-pregn-9-en-5-one starting materials. All temperatures are in degrees centigrade and the Florisil adsorbent used is described above.

EXAMPLE A

A solution of 3.2 g. of 17α-ethyltestosterone in 50 ml. methylene chloride and 25 ml. ethyl acetate was ozonized at −70° (acetone-Dry Ice bath) until the solution was blue in color. After oxygen was passed through, the solution was evaporated at room temperature in vacuo. The syrupy residue was then dissolved in 100 ml. of glacial acetic acid, and after addition of 5 ml. of 30 percent hydrogen peroxide, left for 24 hours at 0–5°. Following this time, it was evaporated to dryness, dissolved in 1500 ml. ether, and extracted with 2 N sodium carbonate solution. The alkaline extract was poured in ice cold hydrochloric acid. The resultant crystalline 17α-ethyl-17β-hydroxy - 5 - oxo - 3,5 - seco - A - norandrostan - 3 - oic acid was filtered, washed with water and dried. Upon being recrystallized from acetone, it melted at 196–197°.

EXAMPLE B

A solution of 1.5 g. of 17α-ethyl-17β-hydroxy-5-oxo-3,5-seco-A-norandrostan-3-oic acid in 100 ml. of methanol was titrated with 2 N sodium methoxide to the reddish color of phenolphthaleine, and then evaporated to dryness in vacuo, giving as the residue, the sodium salt of 17α - ethyl-17β-hydroxy-5-oxo-3,5-seco-A-norandrostan-3-oic acid. 5 g. of sodium-phenylacetate was added to the residue, and the mixture pyrolyzed in vacuo (<0.1 mm.) at 285–295°, for 2.5 hours. The sublimate was dissolved in acetone, filtered and the filtrate concentrated in vacuo. The resultant syrupy residue was chromatographed on a 60 g. Florisil (adsorbent) column. The fractions eluted with benzene and 0.5 percent ethylacetate in benzene were combined and gave 17α-ethyl-17β-hydroxy-10α-desA-androstan-5-one, M.P. 94–95° after recrystallization from petroleum ether. The fractions eluted with 2 percent and 5 percent ethylacetate in benzene were combined and gave 17-α-ethyl-17β-hydroxy-10β-desA-androstan-5-one, M.P. 185–185.5°, after two recrystallizations from petroleum ether.

To a solution of 100 mg. of 17α-ethyl-17β-hydroxy-10β-desA-androstan-5-one in 10 ml. of absolute ethanol was added one equivalent of sodium ethoxide dissolved in 5 ml. of absolute ethanol. This reaction mixture was maintained at room temperature overnight, then acidified with glacial acetic acid, poured in water and extracted with methylene chloride. The extract was washed with water, dried over anhydrous sodium sulfate and concentrated in vacuo. Thin layer chromatography showed the product to be 17α-ethyl-17β-hydroxy-10α-desA-androstan-5-one. It was obtained crystalline from petroleum ether-ether and melted at 89–95°.

EXAMPLE C 1.13 g. of 17α-ethyl-17β-hydroxy-10α-desA-androstan-5-one was dissolved in 120 ml. of anhydrous ether (or 1.13 g. of 10β-isomer was dissolved in 300 ml. of anhydrous ether), and after cooling in a salt-ice bath, several drops of 30 percent hydrobromic acid in acetic acid were added. This was followed by the dropwise addition during five minutes of 0.684 g. of bromine dissolved in 2 ml. of acetic acid. This addition was synchronized with the decoloration rate of the reaction mixture. Immediately after this, 5 ml. of a saturated solution of sodium bisulfite and 5 ml. of 2 N sodium carbonate solution were added. The mixture was then transferred into a separatory funnel, 500 ml. of ether added, shaken and separated. The ether part was washed with water, dried and evaporated. The resultant bromides were dissolved in 100 ml. of dimethylformamide, and after addition of 3 g. of lithium carbonate, the solution was heated at 100° for 45 minutes. After cooling, it was poured into one liter of ether, washed with water, 1 N hydrochloric acid, 2 N sodium carbonate, water, dried and evaporated. The residue was dissolved in 40 ml. of glacial acetic acid, 1.2 g. of sodium acetate and 1.2 g. of zinc powder added, and the so-formed mixture heated 10 minutes at 80°. It was then poured into one liter of ethylacetate and the resultant solution washed with saturated sodium bicarbonate, then with water, dried and evaporated. The residue was chromatographed on Florisil (adsorbent) column. The fraction with benzene and ½ percent ethylacetate in benzene gave regenerated starting material. Fractions with 1 and 2 percent ethylacetate in benzene gave 17α-ethyl - 17β - hydroxy-desA-androst-9-en-5-one, which after sublimation (140° and 0.1 mm. Hg vacuum), was obtained as a glass. $[\alpha]_D^{25}$ —36.6° (c.=1, $CHCl_3$).

EXAMPLE D

A solution of 6.4 g. of 11α-hydroxy-progesterone in 100 ml. of ethylacetate and 50 ml. of methylene chloride was treated with ozone at —70° until the solution became blue in color. Oxygen was then passed through and the solution evaporated at room temperature in vacuo. The so-obtained syrupy residue was dissolved in 100 ml. of glacial acetic acid, and after the addition of 5 ml. of 30 percent hydrogen peroxide, left for 24 hours at 2° (in an ice box). The solution was then evaporated in vacuo, and the residue triturated with ether yielding crystals. Recrystallization from acetone yielded 11α-hydroxy-3,5-seco-A-nor-pregnane - 5,20 - dione - 3 - oic acid 3,11-lactone, M.P. 253–256°. $[\alpha]_D^{25}$ +193.3° (c.=1, in chloroform).

EXAMPLE E

A methanolic solution of 7.5 g. of 11α-hydroxy-3,5-seco-A-nor-pregnane - 5,20-dione-3-oic acid 3,11-lactone was treated with one equivalent of 10 N sodium hydroxide solution and then evaporated to dryness. Sodium phenylacetate (26 g.) was added to the so-obtained sodium salt and the mixture pyrolyzed at 295° for two hours in vacuo. The crude sublimate was chromatographed on a silica-gel column and eluted with 10 percent ethylacetate in benzene. The amorphous solid 11α - hydroxy - 10α - desA-pregnane-5,20-dione was first eluted from the column. IR-spectrum in chloroform: 3620 and 3600 cm.$^{-1}$ (—OH); 1706 cm.$^{-1}$ (carbonyl group). NMR-spectrum in deuterochloroform: a doublet for 10α-$CH_3$ at 73.5 and 80.5 c.p.s., downfield from TMS at 60 mc./sec. Further elution of the column with 10 percent ethylacetate in benzene yielded crystalline 11α-hydroxy - 10β - desA-pregnane-5,20-dione which was recrystallized from methylene chloride-petroeum ether, M.P. 150–152°; $[\alpha]_D^{25}$ +84.0° (c.=0.5 in absolute ethanol).

EXAMPLE F

To a solution of 100 mg. of methanesulfonylchloride in 0.7 ml. of pyridine, there was added 100 mg. of 11α-hydroxy-10β-desA-pregnane-5,20-dione. The mixture was then allowed to stand overnight at 2° (in a refrigerator), then was diluted with water (100 ml.) and extracted with chloroform (3×150 ml.) and methylene chloride (100 ml.). The combined organic extracts were washed with water, 1 N hydrochloric acid and again with water, then dried over anhydrous sodium sulfate and evaporated in vacuo. The crystalline residue was recrystallized from ether, giving 11α-hydroxy-10β-desA-pregnane-5,20-dione methanesulfonate, M.P. 139–140°; $[\alpha]_D^{25}$+46° (c.=0.5 in absolute ethanol).

EXAMPLE G

A solution of 200 mg. of 11α-hydroxy-10β-desA-pregnane-5,20-dione methanesulfonate in 50 ml. of dimethylformamide was refluxed for eight hours and then evaporated to dryness. The residue was chromatographed on a Florisil (adsorbent) column. Elution with 2 percent ethylacetate/benzene and evaporation of the eluant yielded desA - pregn - 9 - ene-5,20-dione in the form of colorless needles, M.P. 111–113°. It was shown by mixed melting point to be identical with a sample of the same compound prepared as described in Example J.

EXAMPLE H

To a solution of 20 g. of 11a-hydroxy-progesterone in 150 ml. of pyridine maintained at 0°, there was added 6 ml. of methanesulfonylchloride, and the reaction mixture allowed to stand overnight at 0°. It was then diluted with a large excess of water and extracted with chloroform. The organic extracts were washed with 2 N hydrocholric acid and water, then dried over anhydrous sodium sulfate and evaporated in vacuo. The solid residue was recrystallized from methanol to give 11α-mesyloxy-progesterone, M.P. 159.5–160°; $[\alpha]_D^{25}$+146.6 (c.=1, chloroform).

EXAMPLE I

A solution of 12 g. of 11α-mesyloxy-progesterone in 300 ml. of methylene chloride/ethyl acetate (2:1) was treated with ozone at —70° until the solution became blue in color. The excess of ozone was removed by bubbling oxygen through the reaction mixture for five minutes. Methylene chloride was then removed under reduced presure, and the solution diluted with ethyl acetate to 200 ml. After addition of 12 ml. of 30 percent aqueous hydrogen peroxide, the reaction mixture was then allowed to stand overnight at 2° (i.e., in the refrigerator), then evaporated to a volume of 75 ml. and diluted with 125 ml. of benzene. The aqueous solution, obtained by extraction with 8 portions of 75 ml. 2 N sodium carbonate followed by combining the aqueous extracts was acidified with cold concentrated hydrochloric acid to pH 2 and extracted with methylene chloride. This extract was dried over anhydrous sodium sulfate and evaporated in vacuo to dryness. The residue crystallized when triturated with ether-acetone mixture, yielding crude 11α-mesoxy-5,20-dioxo-3,5 - seco - A - nor - pregnan-3-oic acid. After recrystallization from acetone-petroleum ether, M.P. 152–153°; $[\alpha]_D^{25}$+47.9° (c.=1, chloroform).

EXAMPLE J

A solution of 6 g. of 11α-mesyloxy-5,20-diox-3,5-seco-A-nor-pregnan-3-oic acid in 150 ml. of methanol was mixed with a solution of 1.5 g. of sodium carbonate in 55 ml. of water. The mixture was then transferred into a 1 liter sublimation flask, and evaporated to dryness. To the thus formed sodium salt, 20 g. of sodium phenyl acetate is added, and after closing the top part of the apparatus, this mixture was pyrolyzed at 290° and 0.02 mm. for four hours. The product, which collects on the cold finger, was dissolved in ether and filtered. The filtrate was then evaporated to dryness. Purification of the residue by chromatography on a 40 g. silica-gel column (benzene eluant) gave crystalline desA - pregn - 9 - ene-5,20-dione; M.P. 111–113° (after recrystallization from ether). $[\alpha]_D^{25}$+56.8° (c.=0.25 percent in methanol).

EXAMPLE K

17β - hydroxy - 5 - oxo - 3,5 - seco - A - nor-androstan-3-oic acid is prepared by ozonolysis of testosterone according to the procedure of Example A.

EXAMPLE L

17β - hydroxy - 10α - desA - androstan - 5 - one and 17β - hydroxy - 10β - desA - androstan - 5 - one are prepared from 17β-hydoxy-5-oxo-3,5-seco-A-norandrostan-3-oic acid by conversion of the latter to its sodium salt followed by pyrolysis, according to the procedure of Example B.

EXAMPLE M

17β - hydroxy - desA - androst - 0 - en - 5 - one is prepared from 17β - hydroxy-10α-desA-androstan-5-one by bromination followed by dehydrobromination, according to the procedure of Example C.

EXAMPLE N

DesA-androst-9-ene-5,17-dione is prepared from 17β-hydroxy-10α-desA-androst-9-en-5-one by oxidation of the latter with a 2 precent chromic acid solution in 90 percent acetic acid.

We claim:
1. A compound of the formula:

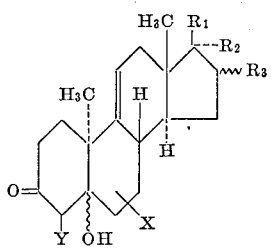

wherein $R_1$ is, individually, acetyl, hydroxy or esterified hydroxy; $R_2$ is, individually, hydrogen or lower alkyl; $R_1$ and $R_2$, taken together, are (17β—OH, 17α-lower alkanoic acid lactone), oxo or lower alkylenedioxy; $R_3$ is hydrogen, lower alkyl, hydroxy or esterified hydroxy; X is a substituent in the 6- or 7-position of the group hydrogen, lower alkyl, lower alkylthio, lower alkanoylthio or halogen; Y is hydrogen or lower alkyl and 20-ketal derivatives thereof.

2. A 5α-hydroxy compound as claimed in claim 1.
3. A compound of the formula:

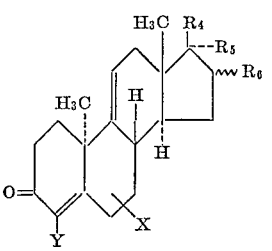

wherein $R_4$ is, individually, hydroxy or esterified hydroxy; $R_5$ is, individually, lower alkyl; $R_4$ and $R_5$, taken together, are (17β—OH, 17α-lower alkanoic acid lactone), oxo or lower alkylenedioxy; $R_6$ is hydrogen, lower alkyl, hydroxy or esterified hydroxy; X is a substituent in the 6- or 7-position of the group hydrogen, lower alkyl, lower alkylthio, lower alkanoylthio or halogen; and Y is hydrogen or lower alkyl.

4. A compound of the formula:

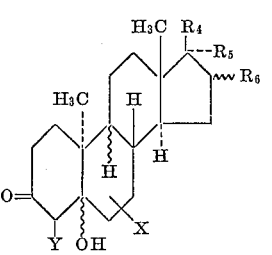

wherein $R_4$ is, individually, hydroxy or esterified hydroxy; $R_5$ is, individually, hydrogen or lower alkyl; $R_4$ and $R_5$, taken together, are (17β—OH, 17α-lower alkanoic acid lactone), oxo or lower alkylenedioxy; $R_6$ is hydrogen, lower alkyl, hydroxy or esterified hydroxy; X is a substituent in the 6- or 7-position of the group hydrogen, lower alkyl, lower alkylthio, lower alkanoylthio or halogen; and Y is hydrogen or lower alkyl.

5. A compound of the formula:

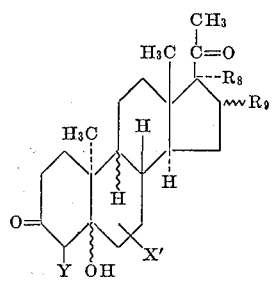

wherein $R_8$ is hydrogen or lower alkyl; $R_9$ is hydrogen, lower alkyl, hydroxy or esterified hydroxy; X' is a substituent in the 6- or 7-position of the group hydrogen, lower alkylthio, lower alkanoylthio or halogen; Y is hydrogen or lower alkyl; and 20-ketal derivatives thereof.

6. A 5-hydroxy compound as claimed in claim 5.
7. A compound of the formula:

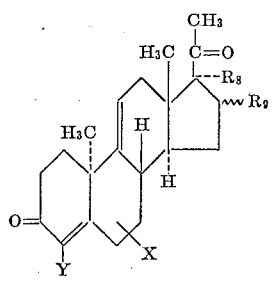

wherein $R_8$ is hydrogen or lower alkyl; $R_9$ is hydrogen, lower alkyl, hydroxy or esterified hydroxy; X is a substituent in the 6- or 7-position of the group hydrogen, lower alkyl, lower alkylthio, lower alkanoylthio and halogen; Y is hydrogen or lower alkyl; and 20-ketal derivatives thereof.

8. A compound of the formula:

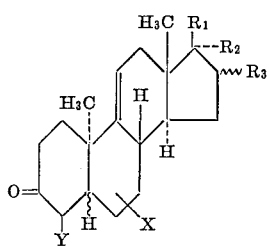

wherein $R_1$ is, individually, hydroxy, esterified hydroxy or acetyl; $R_2$ is, individually, hydrogen or lower alkyl; $R_1$ and $R_2$, taken together, are (17β—OH, 17α-lower alkanoic acid lactone), oxo or lower alkylenedioxy; $R_3$ is hydrogen, lower alkyl, hydroxy or esterified hydroxy; X is a substituent in the 6- or 7-position of the group hydrogen, lower alkyl, lower alkylthio, lower alkanoylthio and halogen; Y is hydrogen or lower alkyl; and 20-ketal derivatives thereof.

9. A compound of the formula:

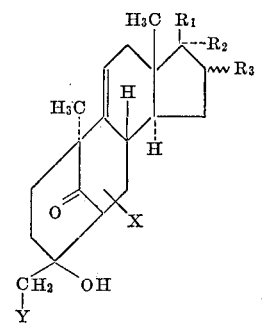

wherein $R_1$ is, individually, hydroxy, esterified hydroxy or acetyl; $R_2$ is, individually, hydrogen or lower alkyl;

$R_1$ and $R_2$, taken together, are (17β—OH, 17α-lower alkanoic acid lactone), oxo or lower alkylenedioxy; $R_3$ is hydrogen, lower alkyl, hydroxy or esterified hydroxy; X is a substituent in the 6- or 7-position of the group hydrogen, lower alkyl, lower alkylthio, lower alkanoylthio or halogen; Y is hydrogen or lower alkyl; and 20-ketal derivatives thereof.

10. In a process for producing at least one of a 5-hydroxy-3-keto-$\Delta^{9(11)}$-10α-steroid of the androstane or pregnane series or a 3-hydroxy-5-keto-4,5-seco-3,6β-cyclo-$\Delta^{9(11)}$-10α-steroid of the androstane or pregnane series, the step which comprises condensing a desA-5-keto-$\Delta^9$-steroid of the androstane or pregnane series with a reaction partner selected from the group consisting of methyl vinyl ketone, ethyl vinyl ketone, 1,3-dichlorobut-2-ene, 1,3-dichloropent-2-ene, 1-bromobutan-3-one, 1-bromobutan-3-one lower alkylene ketal, 1-bromobutan-3-ol, esterified 1 - bromobutan - 3 - ol, etherified 1 - bromobutan - 3 - ol, 1-bromopentan-3-one, 1-bromopentan-3-one lower alkylene ketal, 1-bromopentan-3-ol, esterified 1-bromopentan-3-ol, etherified 1 - bromopentan-3-ol, 1-dialkylamino-3-butanone, 1-dialkylamino-3-pentanone, and quaternary ammonium salts of the latter two reagents.

11. The process as claimed in claim 10 followed by dehydrating at least one of said 5-hydroxy-3-keto-$\Delta^{9(11)}$-10α-steroid and said 3-hydroxy-5-keto-4,5-seco-3,6β-cyclo-$\Delta^{9(11)}$-10α-steroid to produce a 3-keto-$\Delta^{4,9(11)}$-10α-steroid of the androstane or pregnane series.

12. The process for producing a 3-keto-$\Delta^{4,9(11)}$-10α-steroid of the androstane or pregnane series which comprises dehydrating at least one of a 3-hydroxy-5-keto-4,5-seco-3,6β-cyclo-$\Delta^{9(11)}$-10α-steroid of the androstane or pregnane series or a 3-keto-5α-hydroxy-$\Delta^{9(11)}$-10α-steroid of the androstane or pregnane series.

13. The process as claimed in claim 12 wherein the dehydration is effected under acidic conditions.

14. The process for producing a 3-keto-$\Delta^{9(11)}$-10α-steroid of the androstane or pregnane series which comprises reacting a 3-keto-$\Delta^{4,9(11)}$-10α-steroid of the androstane or pregnane series with an alkali metal in ammonia.

15. The process for producing a saturated 3-keto-10α-steroid having a hydrogen atom in the 9α-position which comprises catalytically hydrogenating a 3-keto-$\Delta^{9(11)}$-10α-steroid of the androstane or pregnane series having a 5α-hydrogen or a 5α-hydroxyl.

16. The process for producing a saturated 3-keto-10α-steroid having a hydrogen atom in the 9β-position which comprises catalytically hydrogenating a 3-keto-$\Delta^{9(11)}$-10α-steroid of the androstane or pregnane series having a 5β-hydrogen or a 5β-hydroxyl.

17. The process for producing a saturated 3-keto-9β,10α-steroid which comprises catalytically hydrogenating a 3-keto-$\Delta^{9(11)}$-steroid of the androstane or pregnane series over a platinum catalyst in acid media.

18. The process for producing a saturated 3-keto-9α,10α-steroid which comprises catalytically hydrogenating a 3-keto-$\Delta^{9(11)}$-steroid of the androstane or pregnane series over a noble metal catalyst in neutral reaction media.

19. The process for producing a 3-keto-$\Delta^4$-10α-steroid of the androstane or pregnane series which comprises dehydrating a corresponding 5α-hydroxy-3-keto-10α-steroid.

References Cited
UNITED STATES PATENTS 3,362,968   1/1968   Reerenk et al. _____ 260—397.4

ELBERT L. ROBERTS, Primary Examiner

U.S. Cl. X.R.

260—239.55, 239.57, 397.4, 397.45, 397.47, 586